(12) United States Patent
Kuji et al.

(10) Patent No.: US 6,449,946 B2
(45) Date of Patent: Sep. 17, 2002

(54) CONTROL APPARATUS FOR DIRECT-INJECTION ENGINE

(75) Inventors: Youichi Kuji; Masayuki Kuroki; Junichi Taga; Kazuya Yokota; Keiji Araki, all of Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/779,631

(22) Filed: Feb. 9, 2001

(30) Foreign Application Priority Data

Mar. 3, 2000 (JP) .......................... 2000-059000

(51) Int. Cl.⁷ ................................. F01N 3/00

(52) U.S. Cl. .............. 60/286; 60/274; 60/285; 60/295

(58) Field of Search .......... 60/285, 286, 274, 60/301, 295; 123/300, 430

(56) References Cited

U.S. PATENT DOCUMENTS

| | | | | |
|---|---|---|---|---|
| 5,207,058 A | * | 5/1993 | Sasaki et al. | 60/284 |
| 5,479,775 A | * | 1/1996 | Kraemer et al. | 60/274 |
| 5,642,705 A | * | 7/1997 | Morikawa et al. | 123/300 |
| 6,044,642 A | | 4/2000 | Nishimura et al. | |
| 6,293,095 B1 | * | 9/2001 | Ymamoto et al. | 60/286 |

* cited by examiner

Primary Examiner—Thomas Denion
Assistant Examiner—Binh Tran

(57) ABSTRACT

In steps S25 to S42, in order to activate an inactive catalyst earlier, the air-fuel ratio in a combustion chamber is set to be λ≈1 during a period T1 after engine start until catalyst light-off at around 50% HC purifying ratio immediately after the HC purifying ratio begins to rapidly rise, before the catalyst warms up, divisional injection is made at least during the period T1 required until light-off is reached, and a swirl is weakened during the period T1 compared to a latter period which follows this period T1. The divisional injection is made and the swirl is strengthened even during the latter period.

17 Claims, 17 Drawing Sheets

FIG. 3

| OBJECT TO BE DISCRIMINATED / CONTROLLED \ INPUT PARAMETER | ENGINE SPEED | ACCELERATOR OPENING DEGREE | AIRFLOW METER (INTAKE FLOW RATE DETECTION) | ENGINE WATER TEMPERATURE | INTAKE TEMPERATURE (USED IN INTAKE DENSITY CORRECTION) | ATMOSPHERIC PRESSURE (USED IN INTAKE DENSITY CORRECTION) | O2 SENSOR OUTPUT (OUTPUT WHEN O2 SENSOR IS ACTIVE) (USED IN O2 FEEDBACK) | OTHERS |
|---|---|---|---|---|---|---|---|---|
| RUNNING RANGE | ○ | ○ | | | | | | |
| ESTIMATION OF TEMPERATURE STATE OF CATALYST (ESTIMATE BASED ON HISTORY OF RESPECTIVE PARAMETERS) | ○ | ○ | ○ (TRANSIENT DISCRIMINATION) | ○ (COLD / WARM DISCRIMINATION) | | | | |
| INJECTION AMOUNT (PULSE WIDTH) Ta | ○ | ○ | ○ | ○ | ○ | ○ | | ·Te |
| INJECTION TIMING Qa | ○ | ○ | ○ | ○ | | | | ·INJECTION MODE |
| THROTTLE VALVE OPENING DEGREE θtv | ○ | ○ | ○ | | | | ○ | ·FUEL PRESSURE ·INJECTION MODE |
| OPEN / CLOSE OF INTAKE FLOW CONTROL VALVE | ○ | ○ | ○ | | | | | ·INJECTION MODE |
| EGR VALVE OPENING DEGREE θegr | ○ | ○ | ○ | ○ | ○ | ○ | | ·INJECTION MODE |
| IGNITION TIMING Qig | ○ | ○ | ○ | ○ | | | | ·INJECTION MODE |
| START DISCRIMINATION | ○ | | | | | | | ·STARTER SIGNAL |

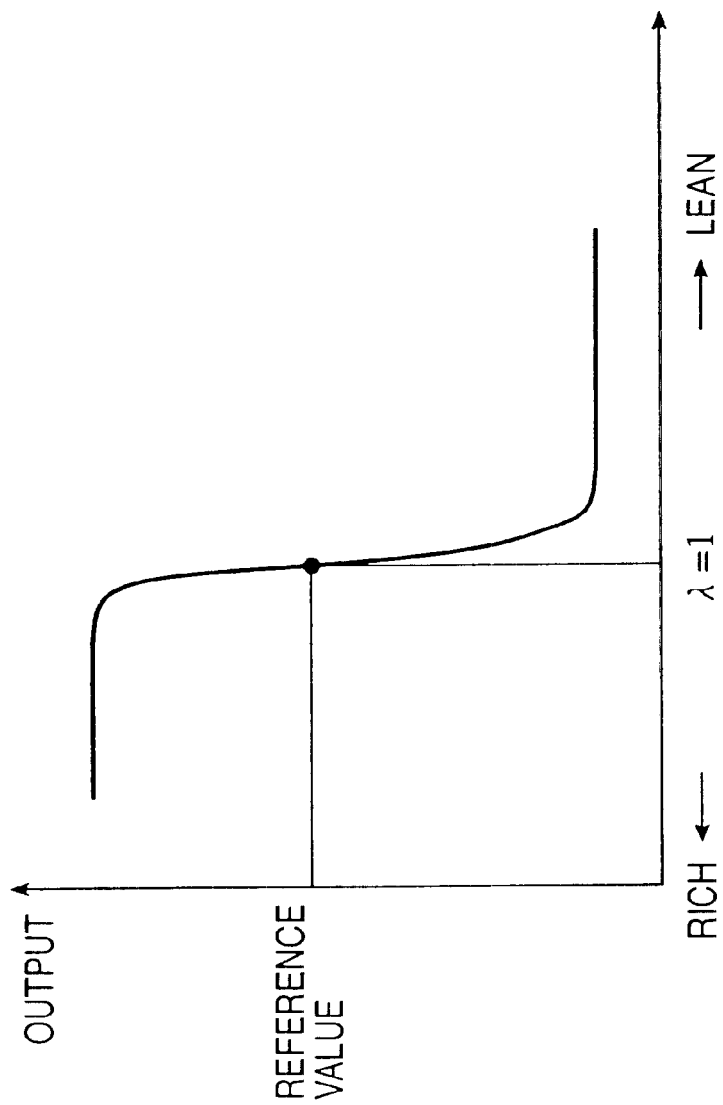

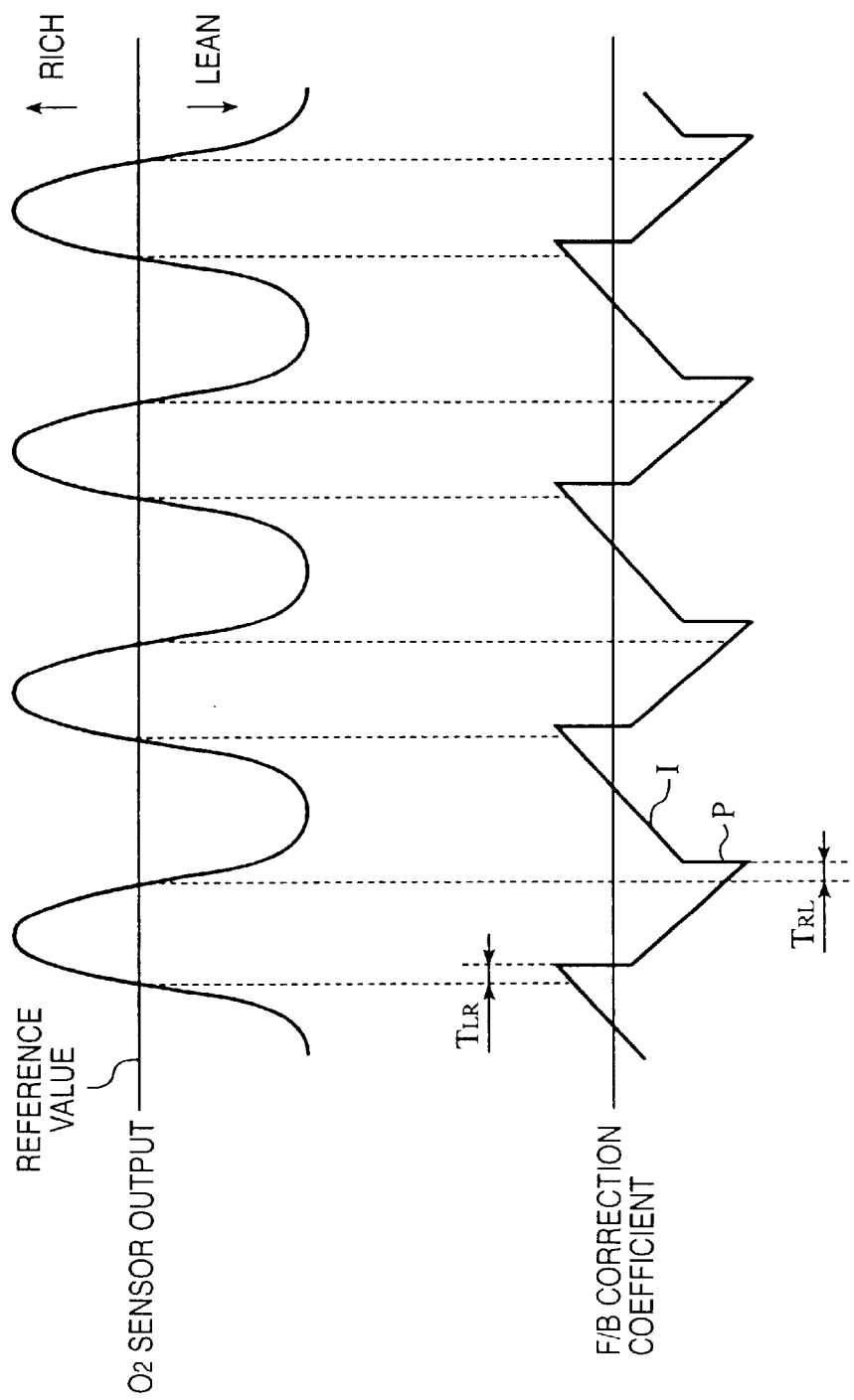

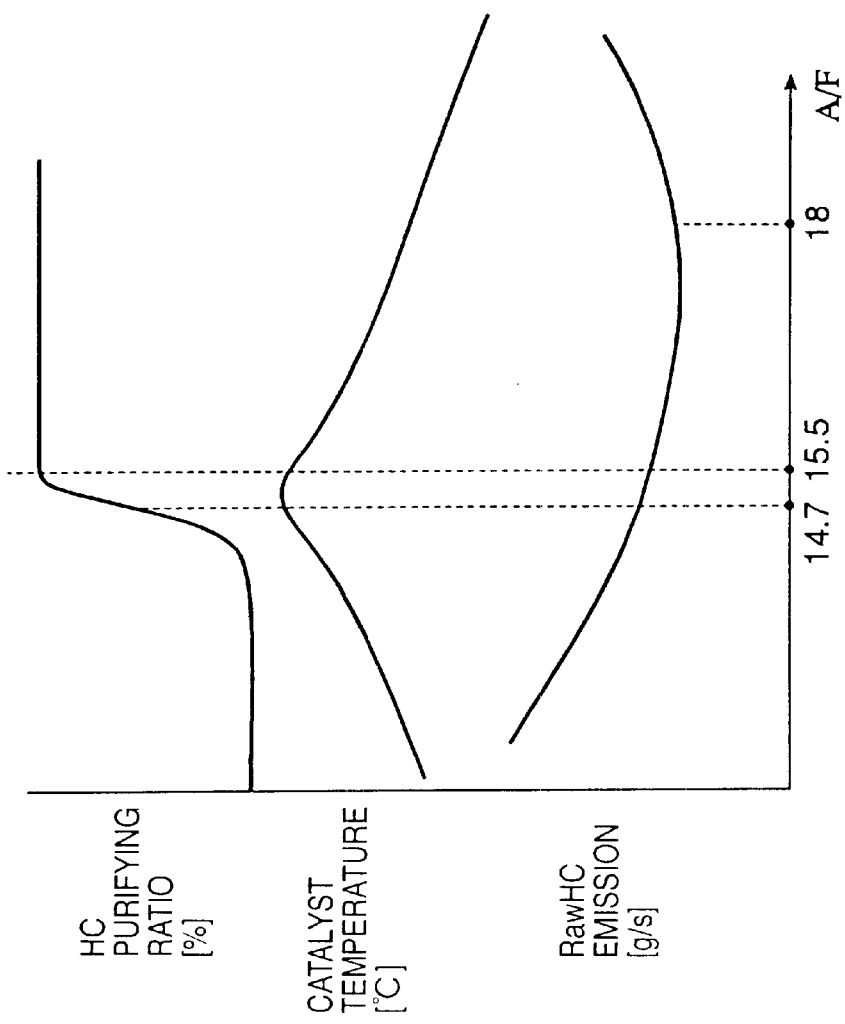

CONTROL APPARATUS FOR DIRECT-INJECTION ENGINE

FIELD OF THE INVENTION

The present invention relates to a control apparatus for a direct-injection engine that reduces HC exhausted immediately after a direct-injection engine is started.

BACKGROUND OF THE INVENTION

HC emission while a catalyst is still inactive immediately after cold start of an engine accounts for a very large portion of total emissions. In order to reduce HC emissions at this timing, the following method is used conventionally; the ignition timing is retarded after the top dead center of compression to raise the exhaust gas temperature so as to activate a three-way catalyst earlier.

However, this method suffers the following two problems.

(1) Since the ignition timing is retarded considerably, fuel economy suffers, and also combustion stability suffers due to a cold period.

(2) Although the period until the catalyst begins to be partially activated and an HC purifying ratio begins to rise rapidly (to be referred to as partial light-off hereinafter) is shortened, HC (RawHC) emitted by the engine during this period is exhausted unpurified, and a scheme for reducing RawHC emitted by the engine during the period until partial light-off is required.

Also, the following technique has been proposed. That is, fuel is injected in two injections, i.e., an intake stroke and compression stroke while the catalyst remains inactive, and stratified air-fuel mixtures are formed, i.e., an air-fuel mixture richer than the stoichiometric air-fuel ratio is formed around a spark plug and a leaner air-fuel mixture is formed around the former air-fuel mixture, thereby promoting warming up of the catalyst, and assuring high combustion stability. More specifically, this reference describes that the air-fuel ratio is set at $\lambda \approx 1$, the injection amount of the intake stroke is set to be equal to or larger than that of the compression stroke, the ignition timing is retarded, and swirl is generated (Japanese Patent Laid-Open No. 10-212987). U.S. Pat. No. 6,044,642 discloses that fuel injection is divided to a trailing injection on a compression stroke and a leading injection earlier than the trailing injection, and a swirl is strengthened so as to activate the catalyst earlier.

However, when a swirl is strengthened before the catalyst warms up, since it has an effect of raising the burning rate, high combustion stability can be assured upon retarding the ignition timing, but an afterburning effect suffers, resulting in an insufficient RawHC reduction effect during the period until partial light-off.

SUMMARY OF THE INVENTION

The present invention has been made in consideration of the aforementioned problems, and has as its object to provide a control apparatus for a direct-injection engine, which can shorten the period required until light-off at a predetermined HC purifying ratio at which at least the HC purifying ratio begins to rise before a catalyst warms up, reduces RawHC emitted by the engine before light-off to the predetermined HC purifying ratio, and can minimize deterioration of fuel economy.

In order to solve the above problems and to achieve the above object, according to the first aspect of a control apparatus for a direct-injection engine of the present invention, the air-fuel ratio in a combustion chamber is set to be $\lambda \approx 1$ before the catalyst warms up, and a varying means operates to divisionally inject fuel during at least a former period from the start of an engine until a catalyst, which is halfway through the catalyst temperature rise before the catalyst warms up, is partially activated, and to set an intake flow strength in the former period to become lower than that in the latter period halfway through the catalyst temperature rise after the former period. In this way, combustion becomes slow to promote afterburning so as to shorten the period required until the predetermined light-off state in which the HC purifying ratio of the catalyst begins to rapidly rise, thus suppressing deterioration of fuel economy and reducing RawHC emitted by the engine before the predetermined light-off state.

According to the second aspect, the varying means increases the intake flow strength while divisionally injecting fuel even during the latter period. In this manner, deterioration of fuel economy can be suppressed while promoting warming up of the catalyst.

According to the third aspect, the former period is a period required until the activation state of the catalyst reaches an HC purifying ratio approximately half a maximum HC purifying ratio of the catalyst itself. As a result, even when the intake flow strength is increased later, sufficiently high HC purification is assured, and warming up of the catalyst can be promoted while suppressing deterioration of fuel economy and assuring high HC purification.

According to the fourth aspect, the varying means operates before the catalyst warms up in a low engine-speed range. In this manner, the amount of RawHC emitted by the engine before the catalyst warms up can be reduced.

According to the fifth aspect, the former period with a low intake flow strength takes a trailing injection timing retarded with respect to that in the latter period with a high intake flow strength. In this fashion, combustion stability can be assured by suppressing fuel mist from scattering, and the exhaust gas temperature can be rapidly raised by slow combustion.

According to the sixth aspect, when fuel is injected in two injections in the former period, the fuel injection amount in leading injection is set to be smaller than that in trailing injection. In this manner, the exhaust gas temperature rise effect and HC & $NO_x$ reduction effects are obtained while assuring combustion stability.

According to the seventh aspect, the fuel injection amount in leading injection is set to be ¼ or more of the total injection amount. As a result, the exhaust gas temperature rise effect and HC & $NO_x$ reduction effects are obtained while assuring combustion stability.

According to the eighth aspect, fuel is two-divisionally injected in intake and compression strokes. In this way, the exhaust gas temperature rise effect and HC & $NO_x$ reduction effects are obtained while assuring combustion stability.

According to the ninth aspect, the air-fuel ratio in a cylinder in the former period is set to be leaner than that in the latter period within the range of $\lambda \approx 1$. As a result, ignitability drop due to offset of a rich air-fuel mixture around the spark plug during the former period with a low intake flow strength can be prevented. In addition, since the air-fuel ratio in the entire cylinder is slightly leaner than $\lambda = 1$, the RawHC emission amount emitted by the engine during the former period with a low HC purifying ratio can be reduced.

According to the 10th aspect, the air-fuel ratio in a cylinder during the former period is set to be close to but leaner than $\lambda = 1$ before beginning of $o_2$ feedback, and is set at λ=1 after beginning of $O_2$ feedback. In this manner, the purification efficiency of a three-way function of the catalyst (three-way catalyst, $NO_x$ catalyst, or the like) can be improved by setting the air-fuel ratio at λ=1 after beginning of $O_2$ feedback, while reducing RawHC emission from the engine.

According to the 11th aspect, a feedback reference value upon $O_2$ feedback during the former period is set to be leaner than that upon $O_2$ feedback during the latter period. As a result, RawHC emission amount reduction and suppression of fuel economy deterioration can be achieved while maintaining the three-way function of the catalyst.

According to the 12th aspect, the ignition timing is retarded with respect to an identical load and identical engine speed after the catalyst warms up. In this manner, while afterburning due to slow combustion can be advanced earlier than normal setting to promote warming up of the catalyst, reducing RawHC emission from the engine.

According to the 13th aspect, a swirl is generated in a cylinder so that the local air-fuel ratio around a spark plug becomes rich by trailing injection, and the varying means changes the swirl ratio in the cylinder. As a result, since a rich air-fuel mixture can be surely locally present around the spark plug, a variation factor of an indicated mean effective pressure Pi (Pi variation factor=Pi standard deviation σ/Pi cycle mean value×100 (%)) in a stratified engine can be reduced, thus suppressing deterioration of combustion stability.

According to the 14th aspect, the spark plug is disposed on the central upper end portion of the cylinder, a fuel injection valve is disposed on the peripheral upper end portion of the cylinder, and a stratification cavity is formed on the top of a piston near the fuel injection valve. With this arrangement, since a rich air-fuel mixture can be surely locally present around the spark plug, the Pi variation factor can be reduced in the stratified engine, thus suppressing deterioration of combustion stability.

According to the 15th aspect, the air-fuel ratio in a combustion chamber is set to be λ≈1 before the catalyst warms up, and an intake flow control valve operates to divisionally inject fuel during at least a former period from the start of an engine until a catalyst, which is halfway through the catalyst temperature rise before the catalyst warms up, is partially activated, and to set an intake flow strength in the former period to become lower than that in the latter period halfway through the catalyst temperature rise after the former period. In this way, combustion becomes slow to promote afterburning so as to shorten the period required until the predetermined light-off state in which the HC purifying ratio of the catalyst begins to rapidly rise, thus suppressing deterioration of fuel economy and reducing RawHC emitted by the engine before the predetermined light-off state.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 is a table showing various parameters to be input to an engine control ECU to detect the states of the engine and a catalyst and to implement engine control;

FIG. 14 is a graph showing the output from an $O_2$ sensor upon $O_2$ feedback control;

FIG. 15 is a chart showing the relationship between a change in output from the $O_2$ sensor and a corresponding change in feedback correction coefficient upon $O_2$ feedback control; and FIG. 16 is a graph showing the relationship among the HC purifying ratio, catalyst temperature, and RawHC emission amount with respect to the air-fuel ratio.

DETAILED DESCRIPTION OF THE PREFERRED EMBODIMENTS

An embodiment of the present invention will be described in detail hereinafter with reference to the accompanying drawings.

[Structure of Direct-injection Engine]

Figure 1:
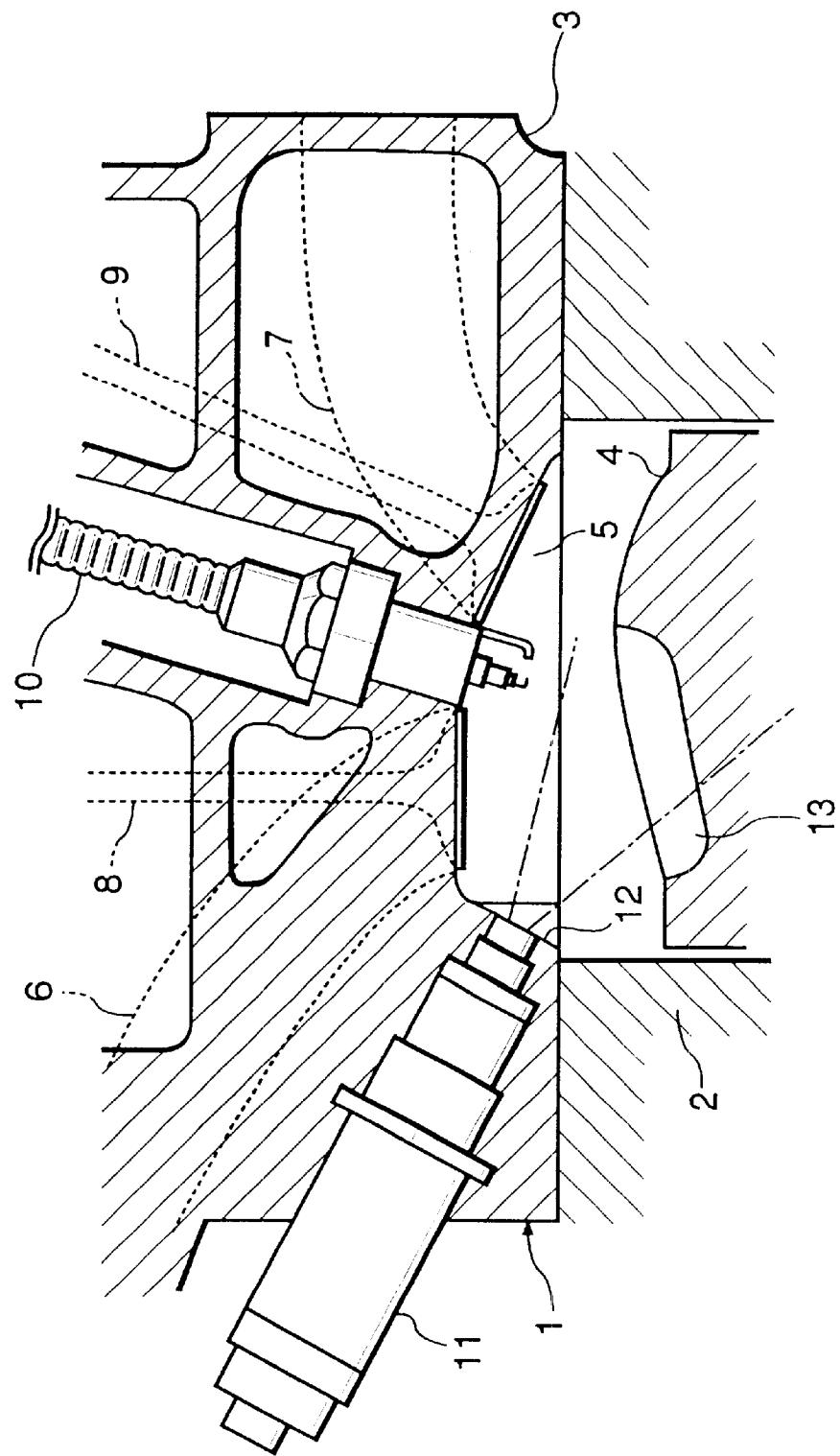
FIG. 1 is a schematic sectional view showing the structure of a combustion chamber portion of a direct-injection engine according to an embodiment of the present invention.

FIG. 1 is a schematic sectional view showing the structure of a combustion chamber portion of a direct-injection engine of this embodiment.

As shown in FIG. 1, reference numeral 1 denotes an engine. A plurality of cylinders are formed in a cylinder block 2, and a cylinder head 3 is fixed to the top of the cylinder block 2 via a gasket. In each cylinder, a piston 4 is inserted, and a combustion chamber 5 is formed between the top surface of the piston 4 and the lower surface of the cylinder head 3. An intake port 6 and exhaust port 7 that communicate with the combustion chamber 5, and an intake valve 8 and exhaust valve 9 that open/close these ports 6 and 7 are disposed, and a spark plug 10 and injector 11 are disposed to oppose the combustion chamber 5. The injector 11 directly injects fuel into the combustion chamber 5.

A recess having a substantially trapezoidal section is formed on the lower surface of the cylinder head 3 to define the upper portion of the combustion chamber 5. The intake port 6 is open to the upper surface portion of the combustion chamber 5, and the exhaust port 7 is open to its slant surface portion. Two each intake and exhaust ports 6 and 7 are juxtaposed in a direction perpendicular to the page of FIG. 1, and intake and exhaust valves 8 and 9 are respectively provided to them. The intake and exhaust valves 8 and 9 are driven by a valve driving mechanism comprising a cam shaft and the like (not shown) and are opened/closed at predetermined timings.

The spark plug 10 is disposed on substantially the central upper portion of the combustion chamber 5, and is attached to the cylinder head 3 so that its spark gap looks into the combustion chamber 5.

The injector 11 is disposed on the peripheral edge portion of the combustion chamber 5, and is attached to the cylinder head 3 on one side of the intake ports 6. A nozzle portion of the injector 11 looks into a wall surface 12 between the upper surface portion of the combustion chamber 5 to which the intake port 6 is open, and a joint surface with respect to the cylinder block 2, and injects fuel obliquely downward.

A stratification cavity 13 is formed on the top portion of the piston 4 near the injector 11. The position and direction of the injector 11, the position of the cavity 13, and the position of the spark plug 10 are set in advance, so that fuel, which is injected from the injector 11 toward the cavity 13 during the latter half of a compression stroke in which the piston 4 is located near the top dead center, is reflected by the cavity 13 and reaches near the spark plug 10.

Figure 2:
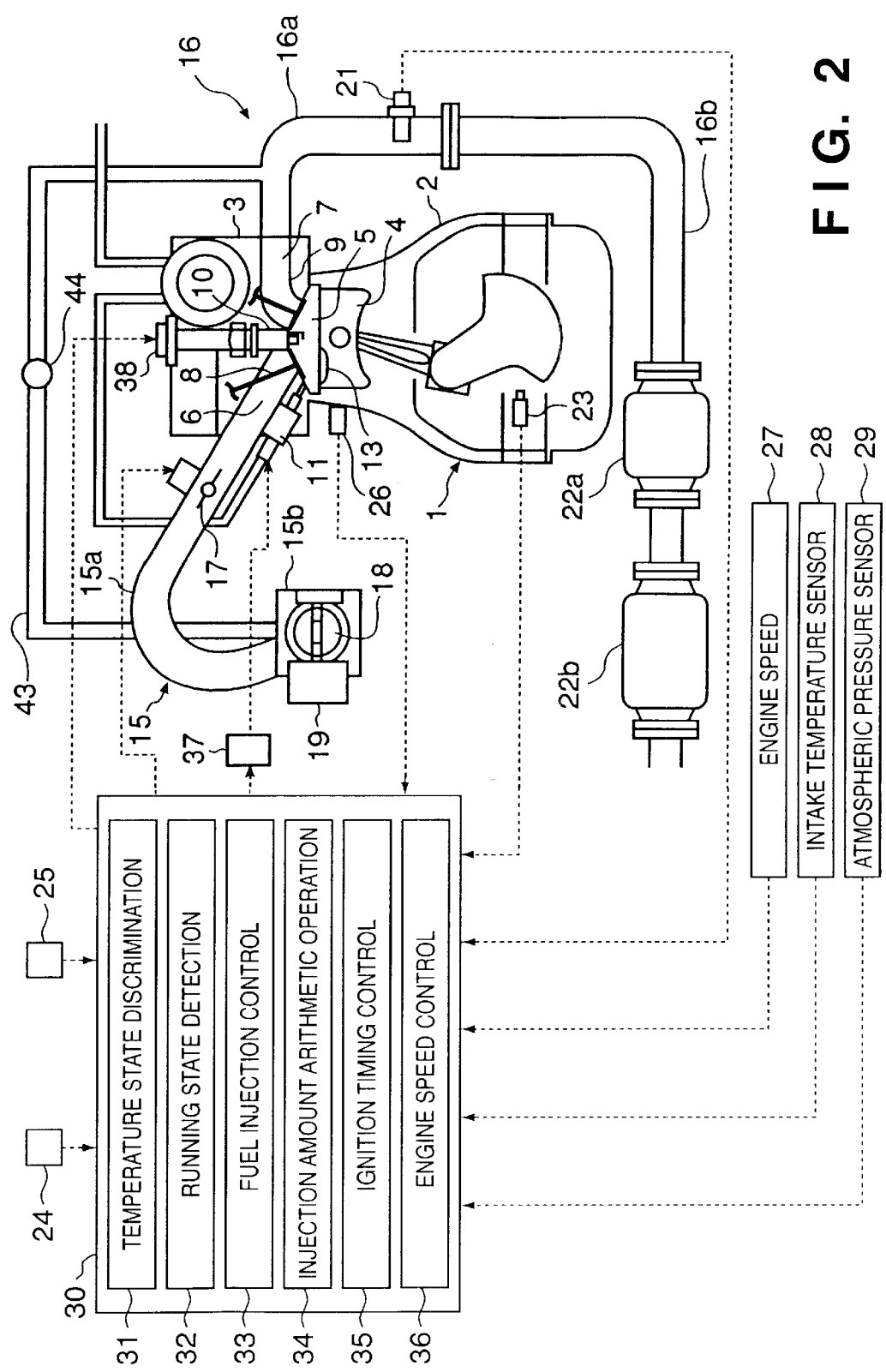
FIG. 2 is a schematic view showing the overall direct-injection engine.

FIG. 2 is a schematic view of the overall direct-injection engine.

As shown in FIG. 2, an intake path 15 and exhaust path 16 are connected to the engine 1. The downstream of the intake path 15 branches at an intake manifold into paths in units of cylinders, two parallel branch paths are formed in each cylinder-dependent path 15a, and two intake ports 6 are open to the combustion chamber 5 in FIG. 1 at the downstream ends of these branch paths. An intake flow control valve 17 is provided to one branch path. By controlling the degree of opening of the intake flow control valve 17, an intake flow (swirl or tumble) is generated in the combustion chamber 5 by intake air supplied from the other branch path, and the intake flow strength is controlled. Note that the intake flow strength can also be changed by controlling the degree of opening of one of the two intake valves or by variably controlling the valve timings.

A throttle valve 18 is provided in the middle of the intake path 15, and is controlled by an electric actuator 19 such as a stepping motor or the like, so as to control the intake air amount.

An $O_2$ sensor 21 for detecting the air-fuel ratio in exhaust gas is provided to the exhaust path 16, and a catalyst device 22 having catalysts for purifying exhaust gas is provided. The catalyst device 22 comprises a three-way catalyst 22a which is disposed on the downstream of the exhaust path 16 and purifies exhaust gas by removing HC, CO, and $NO_x$, and an $NO_x$ catalyst 22b which is disposed on the downstream of the three-way catalyst 22a and adsorbs $NO_x$. The $NO_x$ catalyst 22b adsorbs $NO_x$ at an air-fuel ratio $\lambda>1$ leaner than a stoichiometric air-fuel ratio $\lambda=1$ when stratified combustion is made by setting the air-fuel ratio to fall within a lean range that satisfies $\lambda>1$ after warming up. Also, the $NO_x$ catalyst 22b exhibits a three-way function near the stoichiometric air-fuel ratio, and releases $NO_x$ adsorbed at an air-fuel ratio richer than $\lambda=1$ to react it with HC and CO.

If the catalyst device 22 is disposed immediately downward an exhaust manifold 16a (directly coupled thereto), the catalyst temperature rises too fast in a high-speed, high-load state. For this reason, the catalyst device 22 is inserted in the middle of an exhaust pipe 16b connected to the exhaust manifold 16a away from the engine, so as to protect the catalysts.

An EGR path 43 for recirculating some of exhaust gas is connected between the exhaust and intake paths 16 and 15, and an EGR valve 44 is inserted in this EGR path 43.

A supercharger 40 and a waste gate 41 that bypasses the supercharger 40 are provided to the exhaust pipe 16b on the upstream side of the catalyst device 22. The waste gate 41 is opened/closed by a waste gate valve 42 to suppress an excessive rise of the supercharging pressure.

An engine control ECU (electric control unit) 30 receives signals from the $O_2$ sensor 31 for detecting the oxygen content in exhaust gas, a crank angle sensor 23 for detecting the crank angle of the engine, an accelerator opening degree sensor 24 for detecting the degree of opening of an accelerator (the depression amount of an accelerator pedal), an airflow meter 25 for detecting an intake air amount, a water temperature sensor 26 for detecting the temperature of engine cooling water, an engine speed sensor 27, an intake temperature sensor 28, an atmospheric pressure sensor 29, and the like.

FIG. 3 is a table showing various parameters input to the engine control ECU to detect the states of the engine and catalysts and to implement engine control.

The engine control ECU 30 includes a temperature state discrimination module 31, running state detection module 32, fuel supply control module 33, injection amount arithmetic module 34, ignition timing control module 35, and engine speed control module 36.

The temperature state discrimination module 31 estimates the catalyst temperature on the basis of the histories of the engine speed detection signal from the engine speed sensor 27, the accelerator opening degree detection signal from the accelerator opening degree sensor 24, the intake flow rate detection signal from the airflow meter 25, the water temperature detection signal from the water temperature sensor 26, a fuel injection amount Ta, injection mode, and the like, and discriminates if the catalyst device is in a cold state lower than the activation temperature. Note that the catalyst cold state may be determined if the water temperature is less than a first temperature, and the catalyst warm-up state may be determined if it is equal to or higher than the first temperature. Furthermore, the temperature state discrimination module 31 also estimates the engine temperature, and determines an engine cold state if the water temperature is less than a second temperature; or an engine warm-up state if it is equal to or higher than the second temperature. Note that the second temperature is higher than the first temperature. Note that temperature state discrimination for discriminating the catalyst warm-up state may be implemented by combining water temperature detection and discrimination of the time elapsed after engine start, or may be implemented by directly detecting the catalyst temperature.

The injection mode has an injection pattern such as intake stroke injection (uniform combustion range) or (stratified combustion range), and divisional (split) or simultaneous injection in these ranges, and is set in advance in units of running ranges. Therefore, the injection mode is set by discriminating the running range.

The running state detection module 32 discriminates an engine running range such as a lean range, rich range, and the like on the basis of the engine speed detection signal from the engine speed sensor 27, the accelerator opening degree detection signal from the accelerator opening degree sensor 24, the intake flow rate detection signal from the airflow meter 25, the water temperature detection signal from the water temperature sensor 26, the intake temperature detection signal from the intake temperature sensor 28, and the atmospheric pressure detection signal from the atmospheric pressure sensor 29. Also, the module 32 discriminates a transient running state such as abrupt acceleration, high-load running, and the like of the engine on the basis of the intake flow rate detection signal. Furthermore, the module 32 discriminates an engine cold or warm running state of the engine on the basis of the water temperature detection signal. Moreover, the $O_2$ detection signal from the $O_2$ sensor 21 is output when the $O_2$ sensor 21 is activated, and is used in $O_2$ feedback control.

The fuel injection control module 33 computes a fuel injection timing Qa on the basis of the engine speed detection signal from the engine speed sensor 27, the accelerator opening degree detection signal from the accelerator opening degree sensor 24, the intake flow rate detection signal from the airflow meter 25, the water temperature detection signal from the water temperature sensor 26, and the $O_2$ detection signal from the $O_2$ sensor 21.

The injection amount arithmetic module 34 computes a fuel injection amount Ta on the basis of the engine speed detection signal from the engine speed sensor 27, the accelerator opening degree detection signal from the accelerator opening degree sensor 24, the intake flow rate detection signal from the airflow meter 25, the water temperature detection signal from the water temperature sensor 26, the fuel pressure, and the injection mode.

The fuel pressure is an ejection pressure of a high-pressure fuel pump, which acts on the injector 11, and the injection amount Ta is corrected based on the differential pressure between the fuel pressure sensor output and intracylinder pressure (estimated value).

The fuel injection control module 33 and injection amount arithmetic module 34 control the fuel injection timing Qa and injection amount (pulse width) Ta from the injector 11 via an injector driving circuit 37. In the catalyst cold state, the air-fuel ratio of the entire combustion chamber 5 is set at a substantially stoichiometric air-fuel ratio $\lambda \approx 1$, and divisional injection for divisionally injecting fuel in at least two injections, i.e., trailing injection after the middle period of a compression stroke and leading injection in the former half of an intake period earlier than the trailing injection is made to form an air-fuel mixture at a stoichiometric air-fuel ratio ($\lambda=1$) or richer ($\lambda<1$) in a region near the spark plug 10 in the combustion chamber 5, and to form an air-fuel mixture at an air-fuel ratio $\lambda>1$ leaner than the stoichiometric air-fuel ratio $\lambda=1$ around the region near the spark plug 10 during the period ranging from the intake stroke to the ignition timing.

The ignition timing control module 35 computes an ignition timing $\theta ig$ on the basis of the engine speed detection signal from the engine speed sensor 27, the accelerator opening degree detection signal from the accelerator opening degree sensor 24, the intake flow rate detection signal from the airflow meter 25, the water temperature detection signal from the water temperature sensor 26, and the injection mode.

The ignition timing control module 35 outputs a control signal to an ignition device 38 to control the ignition timing $\theta ig$ in accordance with the engine running state. The module 35 basically controls the ignition timing $\theta ig$ to match MBT (around an ignition timing at which the best torque is produced), but retards the ignition timing when the engine load is very low in the catalyst cold state as needed, as will be described later.

The engine control ECU 30 also controls the intake air amount by outputting a control signal to the actuator 19 that drives the throttle valve 18. When, for example, stratified combustion is made by fuel injection in a compression stroke alone after the engine warms up, the engine control ECU 30 adjusts the intake air amount to attain a lean air-fuel ratio. A throttle valve opening degree $\theta tv$ is computed based on the engine speed detection signal from the engine speed sensor 27, the accelerator opening degree detection signal from the accelerator opening degree sensor 24, the intake flow rate detection signal from the airflow meter 25, the intake temperature detection signal from the intake temperature sensor 28, the atmospheric pressure detection signal from the atmospheric pressure sensor 29, and the injection mode.

As will be described later, when the ignition timing is retarded while the engine load is very low in the catalyst cold state, the intake air amount and fuel injection amount are increased. Furthermore, the engine control ECU 30 controls the intake flow control valve 17 to generate a swirl in the combustion chamber 5 upon, e.g., divisional injection, and controls the EGR valve 44 to attain EGR upon, e.g., stratified combustion in which the air-fuel ratio is leaner than $\lambda=1$.

The intake flow control valve 17 is controlled to open/close by the engine speed detection signal from the engine speed sensor 27, the accelerator opening degree detection signal from the accelerator opening degree sensor 24, the intake flow rate detection signal from the airflow meter 25, and the injection mode, thus controlling the swirl ratio (swirl flow angular velocity/engine rotation angular velocity) in each cylinder.

An EGR valve opening degree $\theta egr$ is computed based on the engine speed detection signal from the engine speed sensor 27, the accelerator opening degree detection signal from the accelerator opening degree sensor 24, the intake flow rate detection signal from the airflow meter 25, the water temperature detection signal from the water temperature sensor 26, and the injection mode.

The engine control ECU 30 discriminates engine start on the basis of the engine speed detection signal from the engine speed sensor 27, and a starter signal.

[Catalyst Temperature Control]

Catalyst temperature control for activating the cold catalyst (catalysts 22a and 22b) early, and reducing HC emissions will be explained below.

FIGS. 4A to 6 are flow charts showing the catalyst temperature control in the direct-injection gasoline engine of this embodiment.

An outline of the catalyst temperature control will be explained first.

In this embodiment, in order to activate the inactive catalyst early, if the engine is running in a low-speed range during a period T1 (former period) after the engine start while the catalyst has not warmed up yet until light-off to a predetermined HC purifying ratio (around 50% purifying ratio) of the catalyst 22a immediately after the HC purifying ratio of the catalyst 22a rises abruptly, and during a period T2 (latter period) from the state of around 50% purifying ratio state of the catalyst 22a until light-off at around 100% HC purifying ratio is reached, the following control is executed:

(i) Fuel is divisionally injected in at least two injections, i.e., trailing injection that starts after the middle period of the compression stroke, and leading injection earlier than the trailing injection during the period from the intake stroke to the ignition timing.

(ii) The air-fuel ratio in the combustion chamber is set to be $\lambda \approx 1$, divisional injection is made during at least a period (T1+T2) required until the catalyst 22a reaches light-off at around 100% purifying ratio, and a swirl during the former period T1 of the period until light-off at around 100% purifying ratio is set to be weaker than the latter period T2.

(iii) Divisional injection is made even during the latter period T2, and the swirl is strengthened.

(iv) During the former period T1 in which the swirl is weakened, the later injection timing is retarded with respect to the latter period T2 in which the swirl is strengthened.

(v) During the period (T1+T2) until the catalyst 22a reaches light-off at around 100% purifying ratio, the fuel injection amount of leading injection is set to be smaller than that of trailing injection and to be ¼ or more the total injection amount.

(vi) The air-fuel ratio in the cylinder during the former period T1 is basically set to be leaner than the latter period T2 within the range of $\lambda \approx 1$.

(vii) The air-fuel ratio during the former period T1 is set to be lean near $\lambda = 1$ before the beginning of $O_2$ feedback, and is set to be $\lambda = 1$ after the beginning of $O_2$ feedback. More specifically, a feedback reference value upon $O_2$ feedback during the former period T1 is set to be leaner than that upon $O_2$ feedback during the latter period T2.

(viii) The ignition timing is retarded with respect to an identical load and identical engine speed after the catalyst warms up.

(ix) The swirl ratio (swirl flow angular velocity/engine rotation angular velocity) in each cylinder is set so that the local air-fuel ratio around the spark plug becomes rich by trailing injection.

The actual flow of the engine control ECU 30 for implementing control operations (i) to (xi) will be explained below with reference to FIGS. 4A to 6.

Figure 4A:
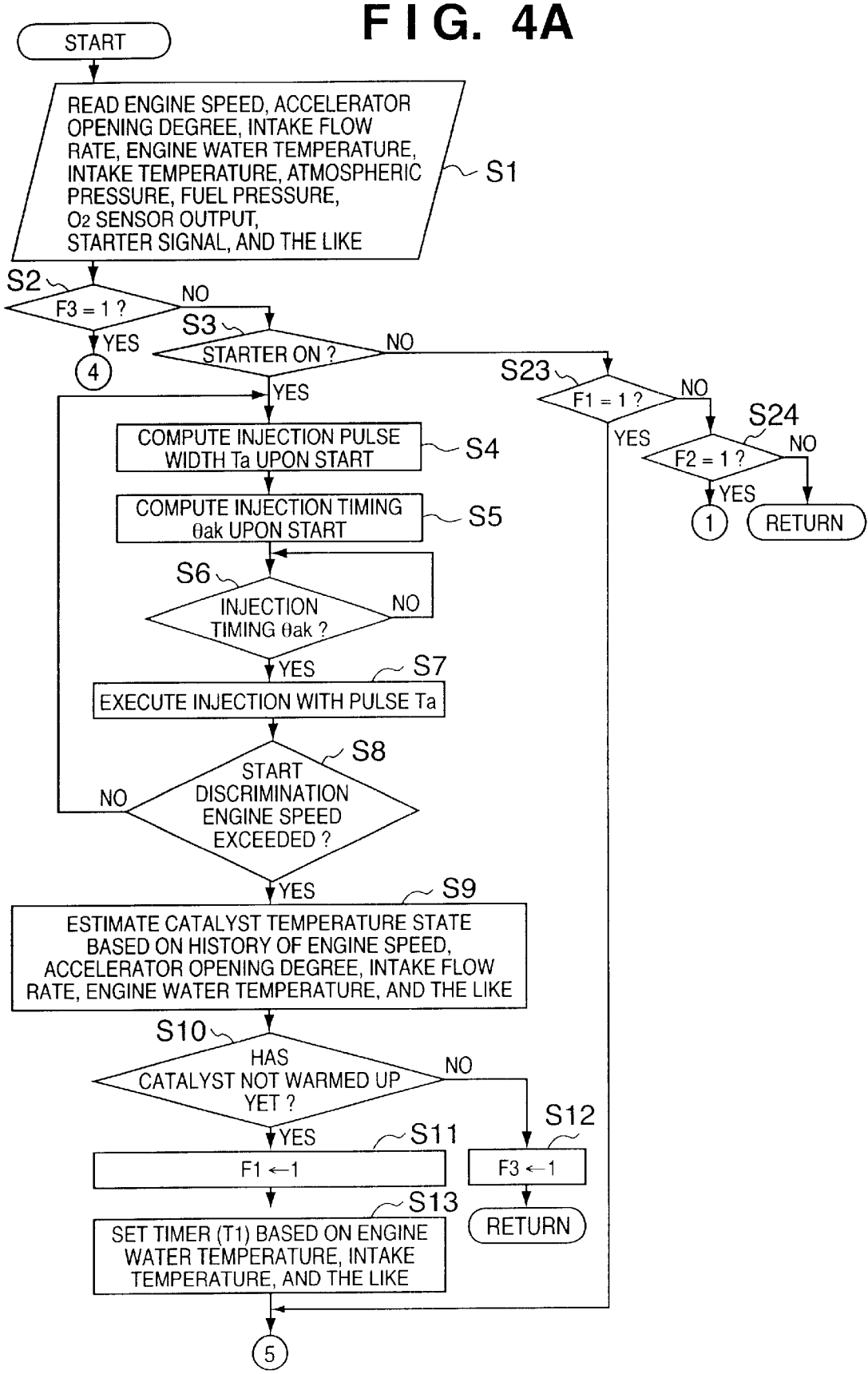
FIGS. 4A and 4B are flow charts showing the catalyst temperature control in a direct-injection gasoline engine in the embodiment of the present invention.
Figure 4B:
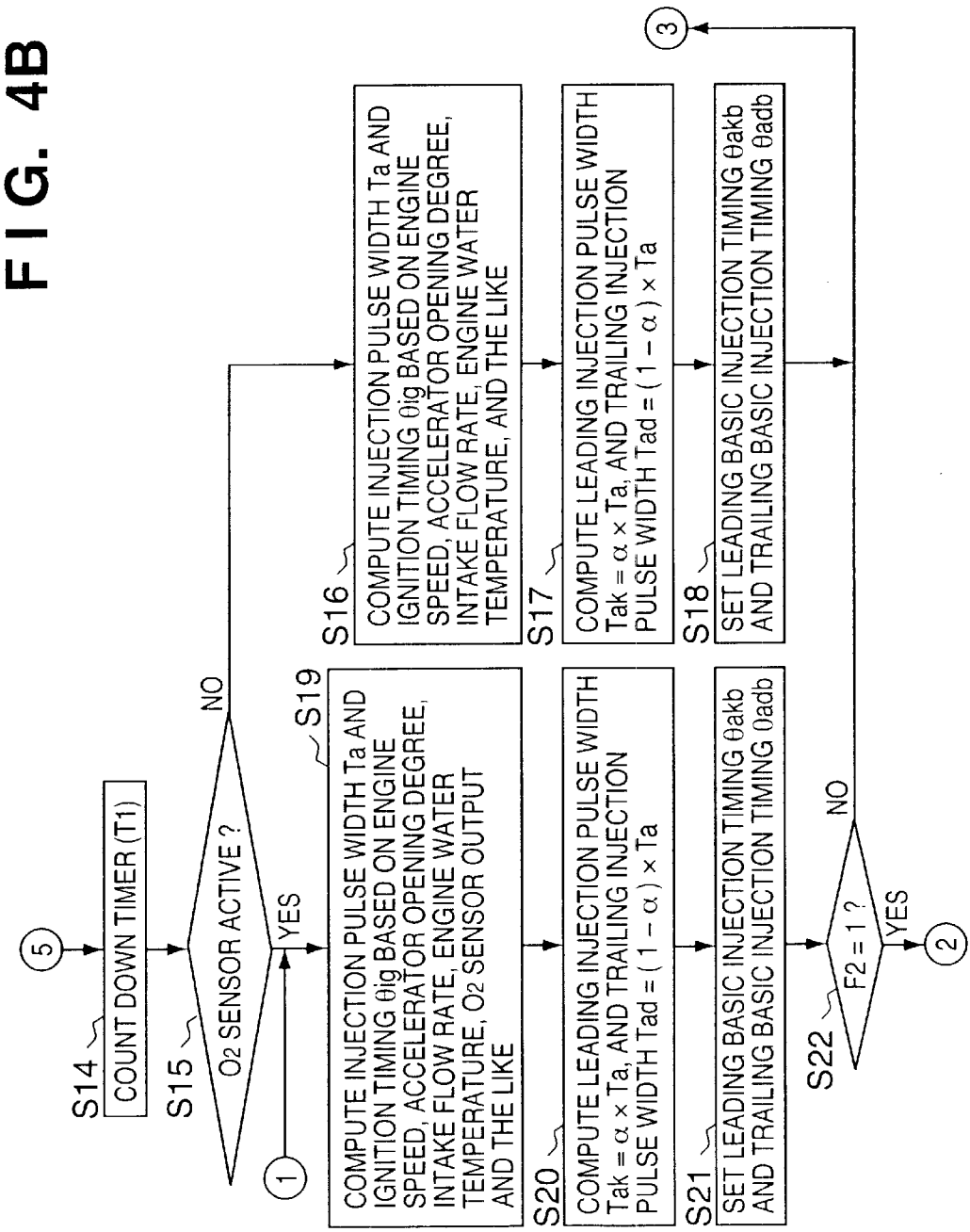

As shown in FIGS. 4A and 4B, the engine control ECU 30 reads detection signals from the $O_2$ sensor 21, the crank angle sensor 23 for detecting the crank angle of the engine, the accelerator opening degree sensor 24, the airflow meter 25, the water temperature sensor 26, the engine speed sensor 27, the intake temperature sensor 28, the atmospheric pressure sensor 29, the fuel pressure sensor, a starter, and the like in step S1.

It is checked in step S2 if a flag F3 is set. The flag F3 is reset to zero when the engine is cold; it is set at 1 when the engine is warm.

If the flag F3 is set in step S2 (YES in step S2), the flow jumps to step S45 (to be described later with reference to FIG. 6).

If the flag F3 is reset (NO in step S2), since the catalyst 22 has not warmed up yet, the flow advances to step S3.

It is checked based on the starter signal in step S3 if the engine is turned on by the starter. If the starter is ON in step S3 (YES in step S3), since the engine has started, the flow advances to step S4; if the starter is OFF (NO in step S3), the flow advances to step S23.

In step S4, the injection pulse width Ta upon starting the engine is computed.

In step S5, an injection timing $\theta$ak upon starting the engine is computed.

In step S6, the control waits based on the crank angle of the engine detected by the crank angle sensor 23 until the injection timing $\theta$ak computed in step S5 is reached. When the injection timing $\theta$ak has been reached (YES in step S6), the flow advances to step S7.

In step S7, fuel is injected by the injector 11 to have the injection pulse width Ta computed in step S4.

It is checked in step S8 if the engine speed has exceeded a predetermined engine speed (e.g., 500 rpm) at which it can be determined that the engine has started. The processes in steps S4 to S7 are repeated until the engine speed exceeds the predetermined engine speed.

In step S9, the catalyst temperature is estimated based on the history of the engine speed, accelerator opening degree, intake flow rate, engine water temperature, and the like.

It is checked in step S10 if the catalyst 22 has not warmed up yet, i.e., its temperature is lower than the activation temperature. If the catalyst 22 has not warmed up yet in step S10 (YES in step S10), a flag F1 is set in step S11; if the catalyst 22 has warmed up (NO in step S10), the flag F3 is set in step S12 and the flow returns. The flag F1 is set if the catalyst 22 has not warmed up yet, and is reset to zero if it has warmed up.

In step S13, a timer is set in the period T1 until the catalyst reaches light-off at around 50% purifying ratio on the basis of the engine water temperature, intake temperature, and the like.

In step S14, the timer begins to count down the period T1 until light-off is reached.

It is checked in step S15 if the $O_2$ sensor is activated. If the $O_2$ sensor is inactive in step S15 (NO in step S15), the flow advances to step S16; if the $O_2$ sensor is active (YES in step S15), the flow advances to step S19.

In step S16, the injection pulse width Ta and ignition timing $\theta$ig are computed on the basis of the engine speed, accelerator opening degree, intake flow rate, engine water temperature, and the like.

In step S17, the injection pulse width Ta is distributed to $\alpha: 1-\alpha$ to compute an leading injection pulse Tak ($=\alpha \times$Ta) and trailing injection pulse Tad ($=(1-\alpha) \times$Ta) in divisional injection.

Figure 5:
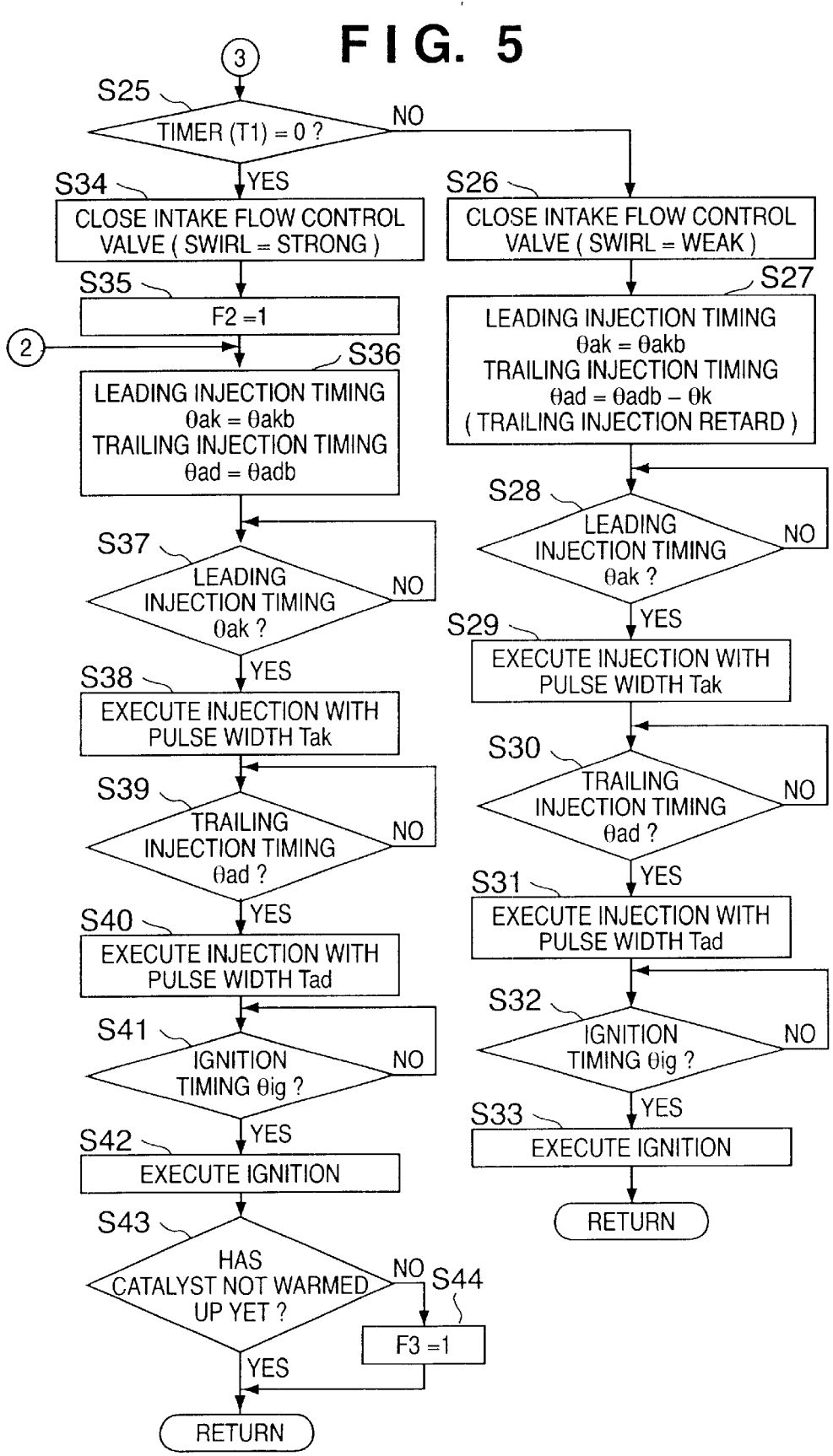
FIG. 5 is a flow chart showing the catalyst temperature control in a direct-injection gasoline engine in the embodiment of the present invention.

In step S18, an leading basic injection timing $\theta$akb and trailing basic injection timing $\theta$adb are set, and the flow advances to step S25 in FIG. 5.

If the $O_2$ sensor is active in step S15 (YES in step S15), the injection pulse width Ta and ignition timing $\theta$ig are computed on the basis of the engine speed, accelerator opening degree, intake flow rate, engine water temperature, oxygen concentration, and the like in step S19.

In step S20, the injection pulse width Ta is distributed to $\alpha: 1-\alpha$ to compute a leading injection pulse Tak ($=\alpha \times$Ta) and trailing injection pulse Tad ($=(1-\alpha) \times$Ta) in divisional injection.

In step S21, a leading basic injection timing $\theta$akb and trailing basic injection timing $\theta$adb are set.

It is checked in step S22 if a flag F2 is set. The flag F1 is set at 1 when the period T1 required until the catalyst reaches light-off at around 50% HC purifying ratio has elapsed, and the intake flow control valve 17 is closed to switch from a weak swirl to a strong swirl.

If the flag F2 is set in step S22 (YES in step S22), the flow jumps to step S36 to be described later with reference to FIG. 5.

If the flag F2 is reset (NO in step S22), the flow advances to step S25 in FIG. 5.

If the starter is OFF in step S3 (NO in step S3), since the engine is at a halt or is running but has not started, it is checked in step S23 if the flag F1 is set.

If the flag F1 is set in step S23 (YES in step S23), since the catalyst 22 has not warmed up yet, the flow jumps to step S14 mentioned above; if the flag F1 is reset (NO in step S23), since the catalyst 22 has warmed up, the flow jumps to step S24.

It is checked in step S24 if the flag F2 is set.

If the flag F2 is set in step S24 (YES in step S24), since the period T1 required until the catalyst reaches light-off at around 50% HC purifying ratio has elapsed, the flow jumps to step S19 mentioned above.

If the flag F2 is reset in step S24 (NO in step S24), the flow returns.

As shown in FIG. 5, it is checked in step S25 if the timer has counted down the period T1.

If the period T1 has not elapsed yet in step S25 (NO in step S25), the flow advances to step S26; if the period T1 has elapsed (YES in step S25), the flow advances to step S34.

[Process of Former Period T1 Until Catalyst Reaches Light-Off at Around 50HC Purifying Ratio]

In step S26, the intake flow control valve is kept open to set a weak swirl since the period T1 has not elapsed yet.

In step S27, the leading injection timing $\theta ak$ is set to be the leading basic injection timing $\theta ask$ ($\theta ak=\theta akb$), and the trailing injection timing $\theta ad$ is retarded $\theta k$ from the trailing basic injection timing $\theta adb$ ($\theta ad=\theta adb-\theta k$).

In step S28, the control waits based on the crank angle of the engine detected by the crank angle sensor 23 until the leading injection timing $\theta ak$ computed in step S27 is reached. If the leading injection timing $\theta ak$ has been reached (YES in step S28), the flow advances to step S29.

In step S29, fuel is injected from the injector 11 to have the leading injection pulse width Tak computed in step S17 or S20.

In step S30, the control waits based on the crank angle of the engine detected by the crank angle sensor 23 until the trailing injection timing $\theta ad$ (retarded) computed in step S27 is reached. If the trailing injection timing $\theta ad$ has been reached (YES in step S30), the flow advances to step S31.

In step S31, fuel is injected from the injector 11 to have the trailing injection pulse width Tad computed in step S17 or S20.

In step S32, the control waits until the ignition timing $\theta ig$ computed in step S16 or S19 is reached. If the ignition timing $\theta ig$ has been reached (YES in step S32), the flow advances to step S33.

In step S33, the spark plug 10 is ignited at the ignition timing $\theta ig$ computed in step S16 or S19.

[Process of Latter Period T2 After Elapse of Former Period T1]

In step S34, the intake flow control valve 17 is closed to set a strong swirl since the period T1 has elapsed.

In step S35, the flag F2 is set at 1.

In step S36, the leading injection timing $\theta ak$ is set to be the leading basic injection timing $\theta ask$ ($\theta ak=\theta akb$), and the trailing injection timing $\theta ad$ is set to be the trailing basic injection timing $\theta adb$ to restore the timing from trailing injection retard ($\theta ad=\theta adb$).

In step S37, the control waits based on the crank angle of the engine detected by the crank angle sensor 23 until the leading injection timing $\theta ak$ computed in step S36 is reached. If the leading injection timing $\theta ak$ has been reached (YES in step S37), the flow advances to step S38.

In step S38, fuel is injected from the injector 11 to have the leading injection pulse width Tak computed in step S17 or S20.

In step S39, the control waits based on the crank angle of the engine detected by the crank angle sensor 23 until the trailing injection timing $\theta ad$ computed in step S36 is reached. If the trailing injection timing $\theta ad$ has been reached (YES in step S39), the flow advances to step S40.

In step S40, fuel is injected from the injector 11 to have the trailing injection pulse width Tad computed in step S17 or S20.

In step S41, the control waits until the ignition timing $\theta ig$ computed in step S16 or S19 is reached. If the ignition timing $\theta ig$ has been reached (YES in step S41), the flow advances to step S42.

In step S42, the spark plug 10 is ignited at the ignition timing $\theta ig$ computed in step S16 or S19.

It is checked in step S43 if the catalyst 22 has not warmed up yet, i.e., its temperature is lower than the activation temperature. If the catalyst 22 has not warmed up yet in step S43 (YES in step S43), the flow returns; if the catalyst 22 has warmed up (NO in step S43), the flag F3 is set in step S44, and the flow then returns.

Control Executed When Engine is Warm]

Figure 6:
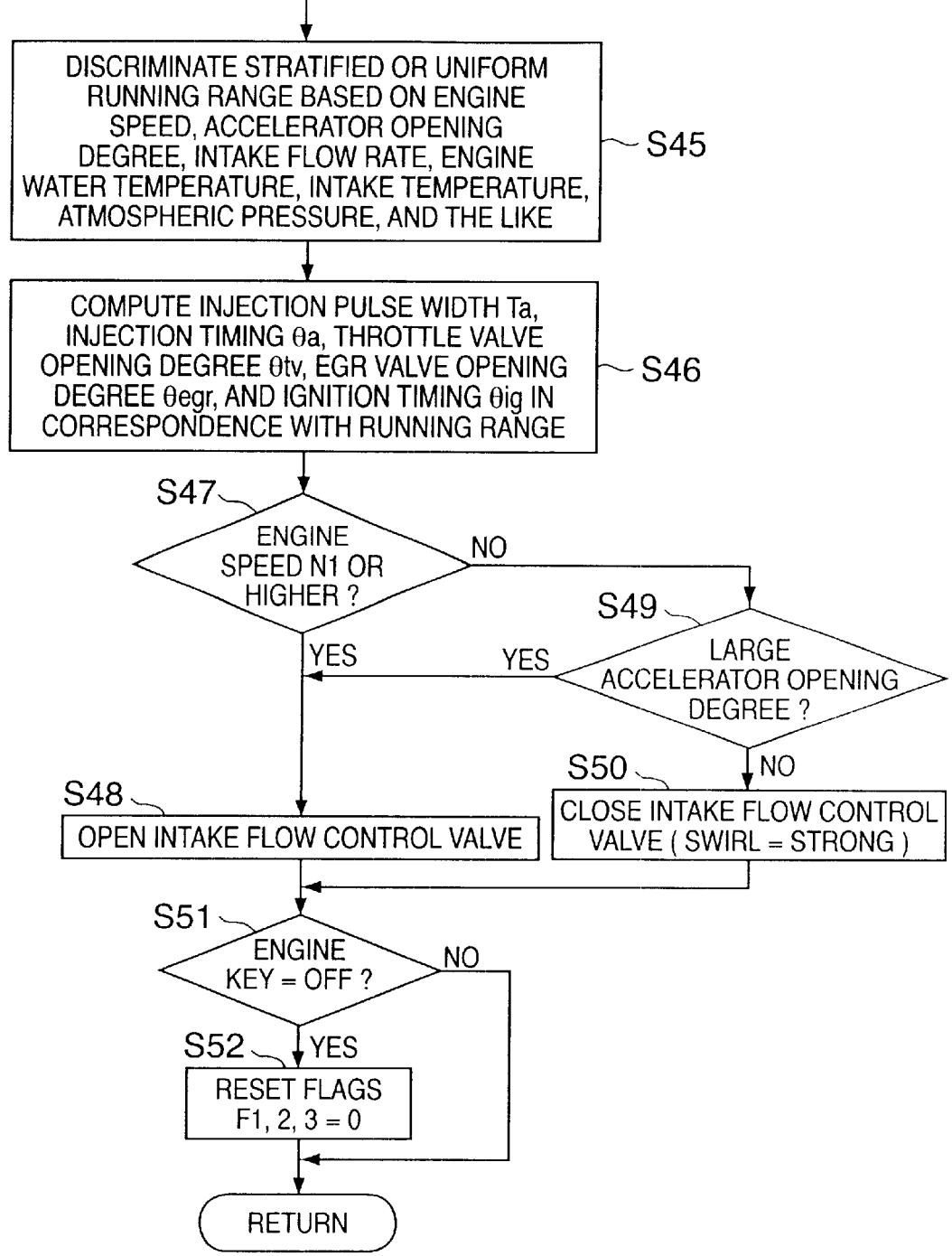
FIG. 6 is a flow chart showing the catalyst temperature control in a direct-injection gasoline engine in the embodiment of the present invention.

As shown in FIG. 6, if the flag F3 is set in step S2 (YES in step S2), since the engine is warm, and the catalyst 22 (catalysts 22a and 22b) has warmed up, the flow advances to step S45 to execute normal control.

In step S45, a running range (stratified combustion or uniform combustion) is determined on the basis of the engine speed, accelerator opening degree, intake flow rate, engine water temperature, intake temperature, atmospheric pressure, and the like.

In step S46, the injection pulse width Ta, injection timing Ta, injection timing $\theta a$, opening degree $\theta tv$ of the throttle valve 18, opening degree $\theta egr$ of the EGR valve 44, and ignition timing $\theta ig$ corresponding to the running range determined in step S45 are computed.

It is checked in step S47 if the engine speed is equal to or higher than a predetermined engine speed N1 (e.g., 2,000 to 2,500 rpm).

If the engine speed is equal to or higher than the predetermined engine speed N1 in step S47 (YES in step S47), the intake flow control valve 17 is opened in step S48, and the flow advances to step S51.

If the engine speed is less than the predetermined engine speed N1 in step S47 (NO in step S47), it is checked in step S49 if the accelerator opening degree is large.

If the accelerator opening degree is large in step S49 (YES in step S49), since the engine is accelerating or is imposed a high load, the flow advances to step S48 to open the intake flow control valve 17 so as to weaken a swirl.

On the other hand, if the accelerator opening degree is not large in step S49 (NO in step S49), the intake flow control valve 17 is closed in step S50 to strengthen a swirl.

It is checked in step S51 if the engine key is OFF.

If the engine key is OFF in step S51 (YES in step S51), the flags F1 to F3 are reset to zero in step S52, and the flow returns.

On the other hand, if the engine key is not OFF in step S51 (NO in step S51), the flow returns.

Figure 7:
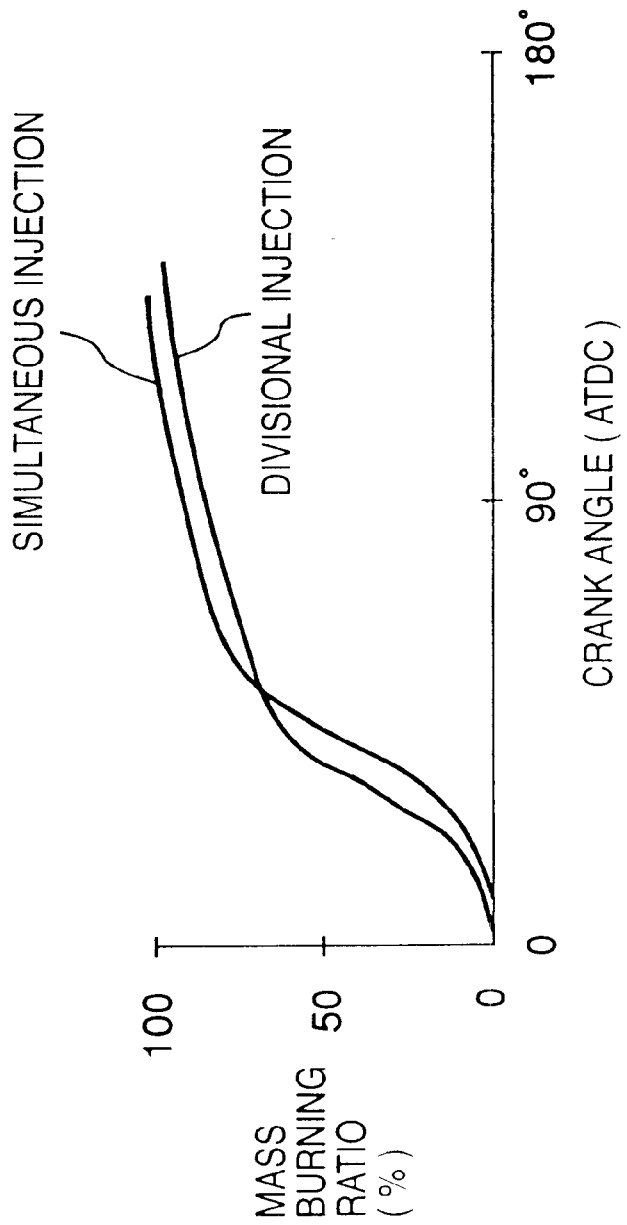
FIG. 7 is a graph showing the relationship between the crank angle and mass burning ratio, i.e., showing the burning rates of divisional and simultaneous injections.
Figure 8:
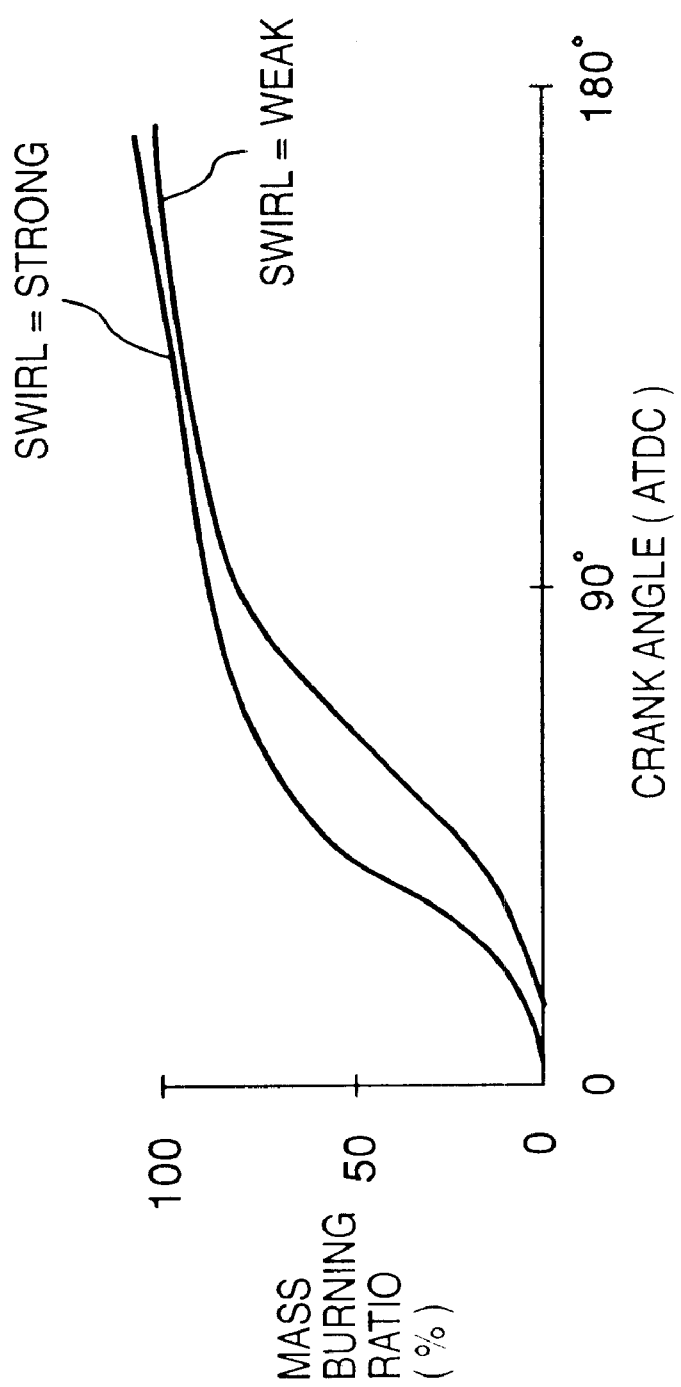
FIG. 8 is a graph showing the relationship between the crank angle and mass burning ratio, i.e., showing the burning rates of weak and strong swirls.
Figure 9:
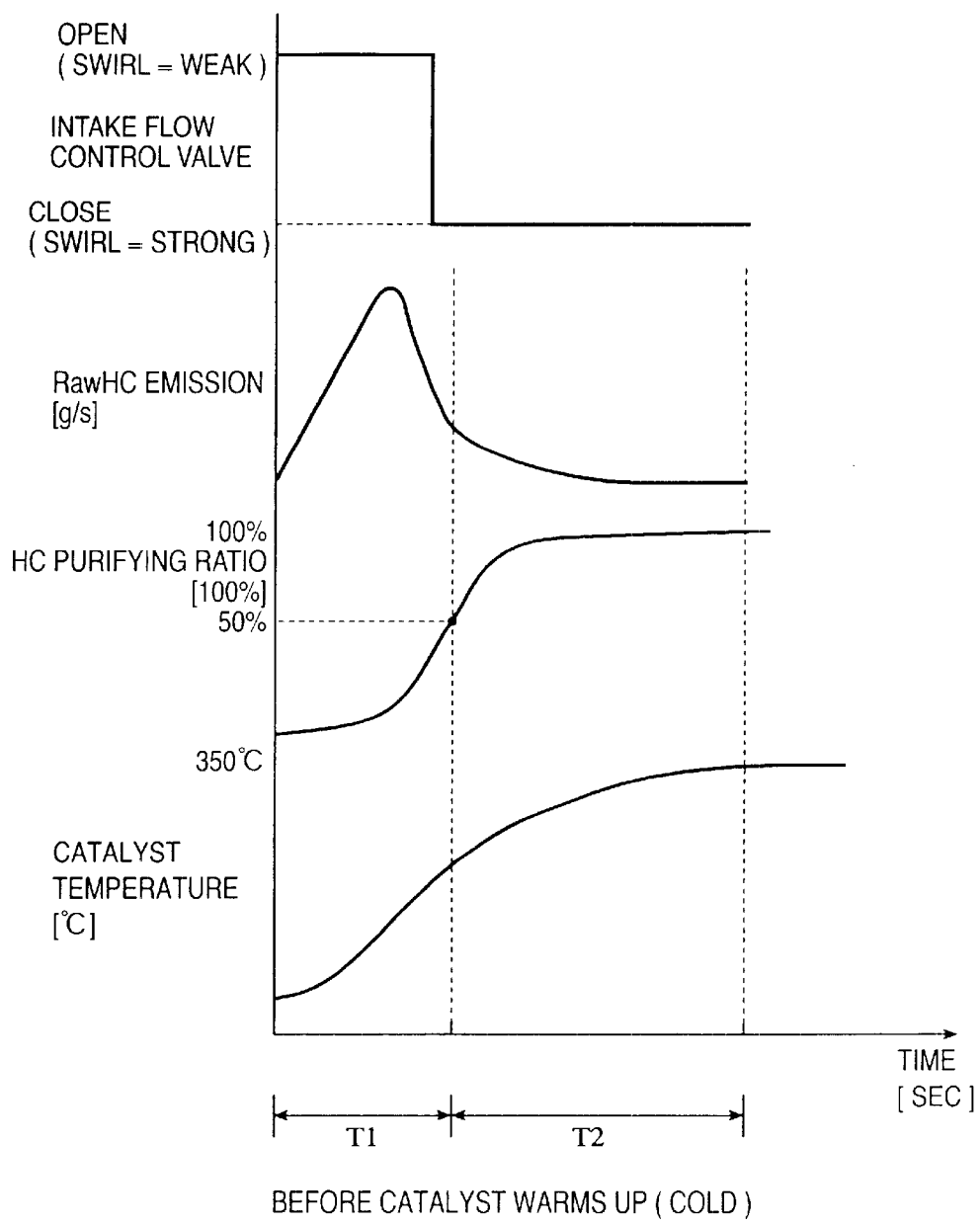
FIG. 9 is a graph showing the relationship among the strong and weak swirls, RawHC emission amount, HC purifying ratio, and catalyst temperature before and after a period in which the catalyst reaches light-off.
Figure 10:
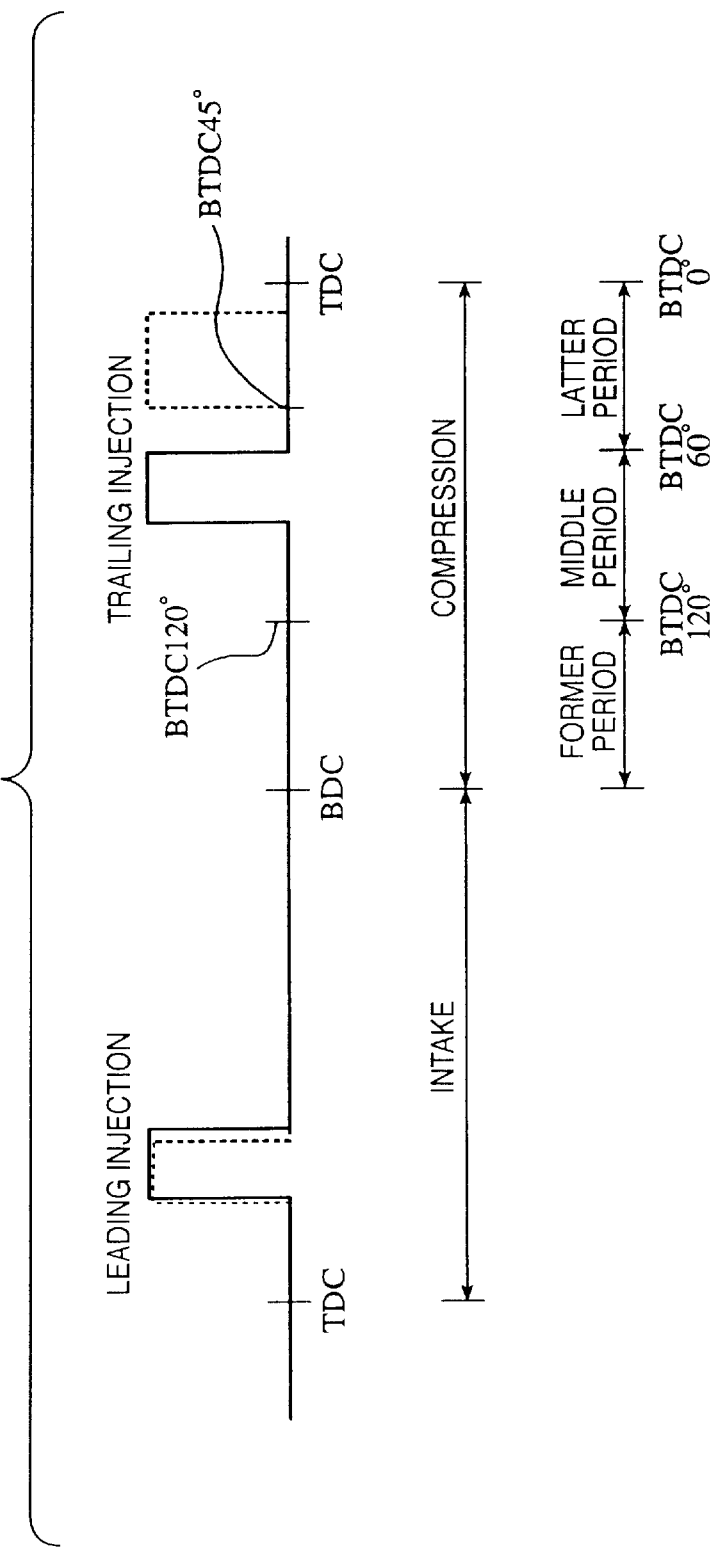
FIG. 10 is a timing chart showing the fuel injection amounts and injection timings in two-divisional injections.
Figure 11:
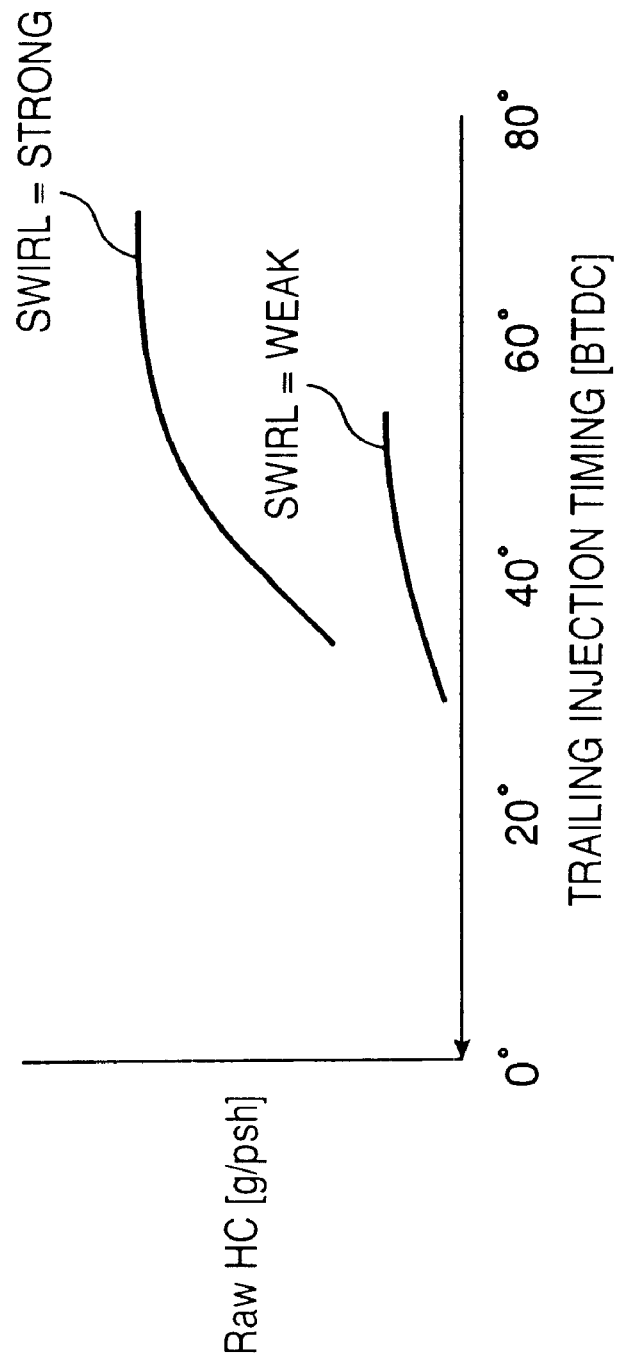
FIG. 11 is a graph showing the relationship between the trailing injection timing and RawHC emission amount.
Figure 12:
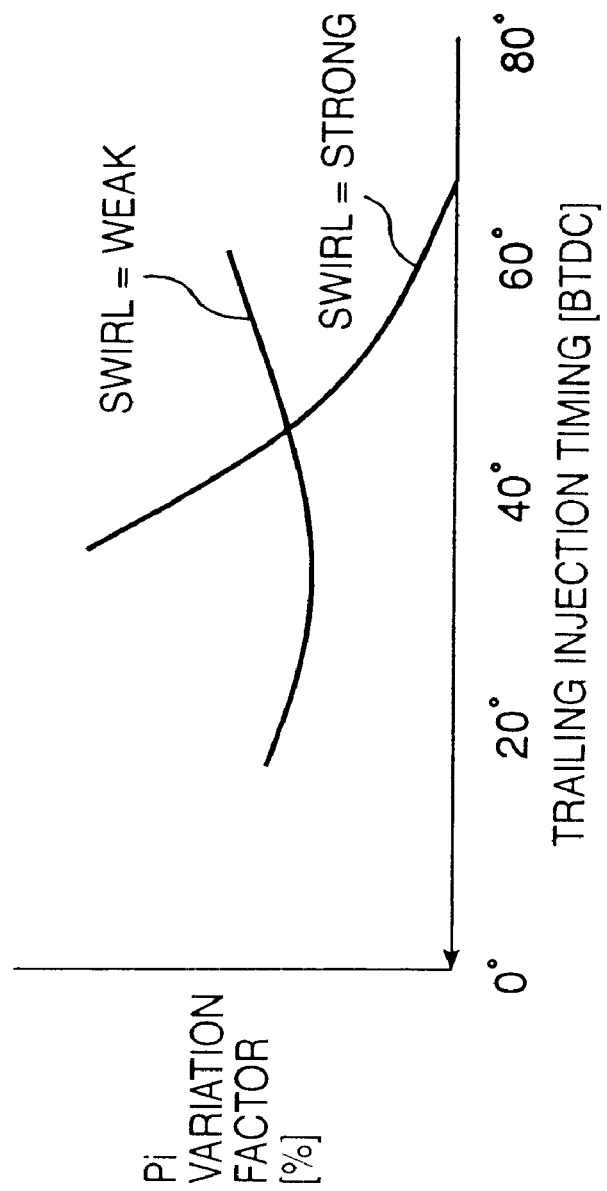
FIG. 12 is a graph showing the relationship between the trailing injection timing and Pi variation factor.
Figure 13:
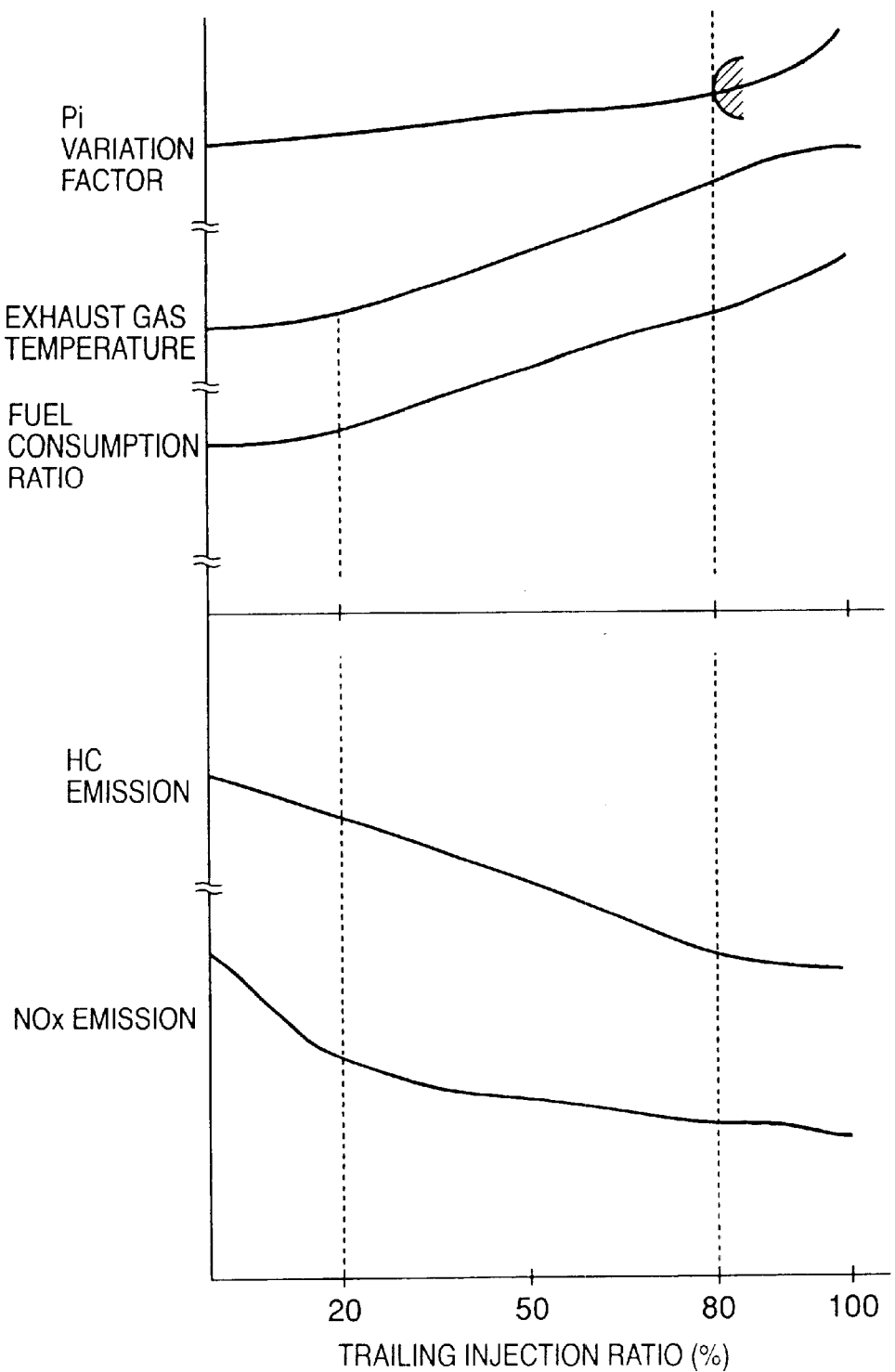
FIG. 13 is a graph showing the relationship among the trailing injection ratio, Pi variation factor, exhaust gas temperature, fuel consumption ratio, HC emission amount, and $NO_x$ emission amount.

FIGS. 7 and 8 show the relationship between the crank angle and mass burning ratio, and they indicate that the burning rate becomes higher with increasing mass burning ratio while the crank angle remains the same. FIG. 7 compares the burning rates in divisional and simultaneous injections. FIG. 8 compares the burning rates of weak and strong swirls. FIG. 9 shows the relationship among the weak and strong swirls, RawHC emission amount, HC purifying ratio, and catalyst temperature before and after a period required until the catalyst 22 reaches light-off at around 100% purifying ratio. FIG. 10 is a timing chart showing the fuel injection amount and injection timing in two-divisional injections. FIG. 11 shows the relationship between the trailing injection timing and RawHC emission amount. FIG. 12 shows the relationship between the trailing injection timing and Pi variation factor. FIG. 13 shows the relationship among the trailing injection ratio, Pi variation factor, exhaust gas temperature, fuel consumption ratio, HC emission amount, and $NO_x$ emission amount.

In the aforementioned flow, since fuel is divisionally injected in at least two injections, i.e., trailing injection after the middle period of the compression stroke and leading injection earlier than the trailing injection during the period from the intake stroke to the ignition timing during the period T1 required until the catalyst 22a reaches light-off at around 50% HC purifying ratio (steps S26 to S33), the burning rate results in slow combustion compared to simultaneous injection, as shown in FIG. 7, so as to promote afterburning and warming up of the catalyst 22, resulting in an increase in HC purifying ratio. Therefore, the RawHC emission amount can be reduced.

Note that the middle period of the compression stroke means that when the compression stroke is divided into three periods, i.e., former, middle, and latter periods, as shown in FIG. 10, i.e., a period ranging from BTDC (before the top dead center) 120° to BTDC 60° of the crank angle. Therefore, trailing injection starts after BTDC 120°. If the trailing injection timing is too late, since combustion stability suffers, as will be described later, trailing injection preferably starts before an elapse of a ¾ period of the compression stroke (before BTDC 45°).

That is, trailing injection is set to start within the period ranging from BTDC 120° to BTDC 40°, and leading injection is set to start in an appropriate period before trailing injection, e.g., within the period of the intake stroke, as shown in FIG. 10.

While divisional injection is made at least during the period T1, a weak swirl is generated during this period T1 (step S26).

Since a swirl is weakened during the period T1 required until the catalyst 22a reaches light-off at around 50% HC purifying ratio, the burning rate becomes slow compared to a strong swirl, as shown in FIGS. 8 and 9, thus promoting afterburning to increase the exhaust gas temperature. As a result, since warming up of the catalyst is promoted to increase the HC purifying ratio, the unpurified HC emission amount can be reduced.

When a weak swirl state continues, fuel economy deteriorates although the RawHC reduction and catalyst warming up effects slightly improve. For this reason, deterioration of fuel economy is suppressed by changing from a weak swirl to a strong swirl while making divisional injection even in the latter period T2 (step S34). Note that a swirl may be strengthened by simultaneously injecting fuel in only the intake period during the latter period T2.

Since the engine 1 shown in FIG. 1 has, on the top of each piston 4, the stratification cavity 12 for trapping fuel injected from the injector 11 and guiding it toward the spark plug 10, the swirl ratio (swirl flow angular velocity/engine rotation angular velocity) in each cylinder is set so that the local air-fuel ratio around the spark plug 10 becomes rich by trailing injection upon fuel injection from the injector 11 after the middle period of the compression stroke 11.

Furthermore, as shown in FIG. 10, the trailing injection timing θad (dotted curve) during the period T1 in which a swirl is weakened is retarded compared to the trailing injection timing θad (solid curve) during the period T2 in which a swirl is strengthened (step S27). In this way, since combustion stability can be assured by suppressing fuel mist from spreading, and the exhaust gas temperature can be rapidly raised by slow combustion, the catalyst 22 is activated earlier to reduce RawHC emission, as shown in FIG. 11. Also, since a rich air-fuel mixture can be locally present around the spark plug 10, the Pi variation factor can be reduced to suppress combustion stability drop, as shown in FIG. 12.

In divisional injection before the catalyst warms up, both leading and trailing injections are controlled to inject fuel that contributes main burning within a main burning period. That is, in general, the mass fuel ratio up to around 10% in the burning process in the combustion chamber is called an initial burning period, and that ranging from around 10% to around 90% is called a main burning period, and initial burning in which trailing injection fuel ignites and burns ranges from the initial burning period to the former period of the main burning period. Hence, the injection amounts are set so that an air-fuel mixture at an air-fuel ratio at which leading injection fuel can catch fire (capable of flame propagation) due to burning of trailing injection fuel is formed to make the leading injection fuel contribute to main burning together with trailing injection fuel, and a lean air-fuel mixture formed by the leading injection fuel burns slowly.

More specifically, as the air-fuel ratio that allows spread of flame due to burning of trailing injection fuel, the leading injection amount during the period T1 is set to be smaller than the trailing injection amount compared to the latter period T2, and is set to be ¼ (25%) or more the total injection amount (conversely, the trailing injection amount is suppressed to be ¾ (75%) or less the total injection amount).

As shown in FIG. 13, when the trailing injection ratio is smaller than 20%, the exhaust gas temperature rise effect and $HC/NO_x$ reduction effect cannot be sufficiently obtained; when the trailing injection ratio exceeds 20%, the exhaust gas temperature rise effect and $HC/NO_x$ reduction effect increase with increasing trailing injection ratio, but the Pi variation factor and fuel consumption rate increase gradually. When the trailing injection ratio exceeds 80%, the Pi variation factor exceeds an allowable range, and combustion stability suffers.

Therefore, in order to assure high combustion stability while obtaining a sufficient exhaust gas temperature rise effect and $HC/NO_x$ reduction effect, the trailing injection ratio preferably falls within the range from 25% to 75%. Within this range, the exhaust gas temperature rise effect and $HC/NO_x$ reduction effect increase with increasing rate injection ratio, i.e., with decreasing leading injection ratio. If a small leading injection amount is set so that the air-fuel ratio in the combustion chamber becomes equal to or higher than a combustible air-fuel ratio (around 30) by only leading injection, a lean air-fuel mixture is formed by leading injection fuel, and burns slowly during the latter period of the burning period. In this way, a sufficiently high exhaust gas temperature rise effect and $HC/NO_x$ reduction effect can be obtained while assuring high combustion stability and suppression deterioration of fuel economy.

FIG. 14 shows the output from the $O_2$ sensor upon $O_2$ feedback. FIG. 15 shows the relationship between a change in output from the $O_2$ sensor upon $O_2$ feedback, and a corresponding change in feedback correction coefficient. FIG. 16 shows the relationship among the HC purifying ratio, catalyst temperature, and RawHC emission amount with respect to the air-fuel ratio.

In this embodiment, in addition to divisional injection, weak swirl, trailing injection timing retard, and control for setting the leading injection amount<trailing injection amount during the period T1 required until the catalyst 22a reaches light-off at around HC purifying ratio, the air-fuel ratio in the combustion chamber during this period T1 is set to be lean ($\lambda \approx 1$) before the beginning of $O_2$ feedback (the $O_2$ sensor is activated) (steps S19 to S22) to reduce the $NO_x$ emission amount by the lean $NO_x$ catalyst, and is set at $\lambda=1$ after the beginning of $O_2$ feedback (steps S16 to S18) to improve the purification efficiency implemented by the three-way function of the catalyst 22.

More specifically, a feedback reference value upon $O_2$ feedback during the period T1 is set to be leaner than that upon $O_2$ feedback during the latter period T2 (e.g., AF 14.7→15.5). After the $O_2$ sensor is activated, feedback control starts to set the stoichiometric air-fuel ratio having the detection signal of the $O_2$ sensor as a reference value (e.g., 0.55 V).

The output from the $O_2$ sensor abruptly changes at the stoichiometric air-fuel ratio ($\lambda=1$), as shown in FIG. 14. In the feedback control based on the output from the $O_2$ sensor, the feedback correction coefficient of the fuel injection amount can be changed between a proportional gain as a P value and an integral action rate as an I value, as shown in FIG. 15. When the output from the $O_2$ sensor is rich, the proportional gain is changed in a direction to decrease the fuel injection amount by the P or I value; when the output from the $O_2$ sensor is lean, the proportional gain is changed in a direction to increase the fuel injection amount by the P or I value. Also, delay times $T_{RL}$ and $T_{LR}$ are respectively set for inversion from rich to lean of the $O_2$ sensor and vice versa.

When the air-fuel ratio is controlled to be leaner than the stoichiometric air-fuel ratio, the delay time $T_{RL}$ is adjusted to be larger than $T_{LR}$ to shift the average value of the feedback correction coefficient in the direction to decrease the fuel injection amount, thus adjusting to shift the air-fuel ratio toward the leaner side than the stoichiometric air-fuel ratio. Also, the same adjustment can be achieved by using different P and I values depending on whether the output from the $O_2$ sensor is rich or lean.

In $O_2$ feedback control, normal control is made to set the air-fuel ratio at the stoichiometric air-fuel ratio by setting equal delay times $T_{RL}$ and $T_{LR}$ on the rich and lean sides.

As shown in FIG. 16, when a lean air-fuel ratio is set ($\lambda \approx 1$) before the beginning of $O_2$ feedback during the period T1, warming up of the catalyst can be promoted to increase the HC purifying ratio, thus reducing emission of unpurified HC.

When the catalyst has not warmed up, the ignition timing θig is retarded with respect to an identical load and identical engine speed after the catalyst warms up, and afterburning by slow combustion is promoted to effect warming up of the catalyst, thus reducing emission of unpurified HC.

In this embodiment, when the three-way catalyst 22a has reached light-off at around 100% purifying ratio, completion of warming up of the $NO_x$ catalyst 22b is determined. Alternatively, the period T2 may be set based on the state of the $NO_x$ catalyst 22b.

Note that the present invention can also be applied to an engine which as an $NO_x$ catalyst alone, and can be applied to changes and modifications of the above embodiment within the scope of the invention.

The present invention is not limited to the above embodiments and various changes and modifications can be made within the spirit and scope of the present invention. Therefore, to apprise the public of the scope of the present invention the following claims are made.

What is claimed is:

1. A control apparatus for a direct-injection engine, which comprises a fuel injection valve to directily inject fuel into a combustion chamber, and an exhaust gas puryfying catalyst inserted in an exhaust path, and divisionally injects fuel in at least two injections including a trailing injection that begins to inject after a middle period of a compression stroke, and a leading injection earlier than the trailing injection within a period from an intake stroke to an ignition timing before the catalyst warms up, comprising:

varying means for forcibly changing an intake flow strength given by (intake flow angular velocity/engine rotation angular velocity) in the combustion chamber, and wherein an air-feul ratio in the combustion chamber is set to be $\lambda \approx 1$ before the catalyst warms up, and said varying means operates to divisionally inject fuel at least during a former period from engine start until the catalyst is in a partial activation state, which is an intermediate point during the catalyst temperature rise, an HC purifying ratio of the catalyst increasing according to the catalyst temperature rise but the HC purifying ratio being smaller than a maximum HC purifying ratio of the catalyst before the catalyst warms up, and to set the intake flow strength in the former period to be lower than in a latter period after the former period starting from the intermediate point.

2. The apparatus according to claim 1, wherein said varying means divisionally injects fuel and increases the intake flow strength even during the latter period.

3. The apparatus according to claim 1, wherein said varying means operates when the engine runs in a low-speed range and before the catalyst warms up.

4. The apparatus according to claim 1, wherein a trailing injection timing during the former period with the low intake flow strength is retarded with respect to the latter period with the high intake flow strength.

5. The apparatus according to claim 1, wherein when fuel is divisionally injected in two injections during the former period, a fuel injection amount in the leading injection is set to be smaller than a fuel injection amount in the trailing injection.

6. The apparatus according to claim 5, wherein the fuel is two-divisionally injected in an intake stroke and compression stroke.

7. The apparatus according to claim 1, wherein the fuel injection amount in the leading injection is set to be not less than ¼ of a total injection amount.

8. The apparatus according to claim 1, wherein an air-fuel ratio in each cylinder during the former period is set to be leaner than the latter period within a range of $\lambda \approx 1$.

9. The apparatus according to claim 1, wherein a feedback reference value upon oxygen feedback during the former period is set to be leaner than a feedback reference value upon oxygen feedback during the latter period.

10. The apparatus according to claim 1, wherein before the catalyst warms up, an ignition timing is retarded with respect to an identical load and an identical engine speed after the catalyst warms up.

11. The apparatus according to claim 1, wherein a spark plug is disposed at a central upper end portion of each cylinder, a fuel injection valve is disposed at a peripheral upper end portion of the cylinder, and a stratification cavity is formed on a top of a piston near the fuel injection valve.

12. The apparatus according to claim 1, wherein the HC purifying ratio rises gradually according to catalyst temperature rise from engine start and rises abruptly at the intermediate point during the catalyst temperature rise, wherein the partial activation state of the catalyst is a light-off state that is the intermediate point during the HC purifying ratio rise, and wherein after the intermediate point the HC purifying ratio starts to rise abruptly.

13. The apparatus according to claim 12, wherein the former period is a period from the engine start until an activation state of the catalyst reaches an HC purifying ratio substantially equal to half the maximum HC purifying ratio of the catalyst.

14. A control apparatus for a direct-injection engine, which comprises a fuel injection valve for directly injecting fuel into a combustion chamber, and an exhaust gas purifying catalyst inserted in an exhaust path, and divisionally injects fuel in at least two injections including a trailing injection that begins to inject after a middle period of a compression stroke, and a leading injection earlier than the trailing injection within a period from an intake stroke to an ignition timing before the catalyst warms up, comprising:

varying means for forcibly changing an intake flow strength in the combustion chamber, wherein an air-fuel ratio in the combustion chamber is set to be $\lambda \approx 1$ before the catalyst warms up, and said varying means operates to divisionally inject fuel at least during a former period from engine start until the catalyst, which is halfway through catalyst temperature rise, is partially activated, before the catalyst warms up, and to set the intake flow strength in the former period to be lower than that in a latter period halfway through the catalyst temperature rise after the former period, and wherein the former period is a period until an activation state of the catalyst reaches an HC purifying ratio substantially equal to half maximum HC purifying ratio of the catalyst.

15. A control apparatus for a direct-injection engine, which comprises a fuel injection valve for directly injecting fuel a combustion chamber, and an exhaust gas purifying catalyst inserted in an exhaust path, and divisionally injects fuel in at least two injections including a trailing injection that begins to inject after a middle period of a compression stroke, and a leading injection earlier than the trailing injection within a period from an intake stroke to an ignition timing before the catalyst warms up, comprising:

varying means for forcibly changing an intake flow strength in the combustion chamber, wherein an air-fuel ratio in the combustion chamber is set to be $\lambda \approx 1$ before the catalyst warms up, and said varying means operates to divisionally inject fuel at least during a former period from engine start until the catalyst, which is halfway through catalyst temperature rise, is partially activated, before the catalyst warms up, and to set the intake flow strength in the former period to be lower than that in a latter period halfway through the catalyst temperature rise after the former period, and wherein an air-fuel ratio in each cylinder during the former period is set to be close to $\lambda \approx 1$ but leaner than $\lambda \approx 1$ before a beginning of oxygen feedback, and is set to be $\lambda \approx 1$ after the beginning of oxygen feedback.

16. A control apparatus for a direct-injection engine, which comprises a fuel injection valve for directly injecting fuel into a combustion chamber, and an exhaust gas purifying catalyst inserted in an exhaust path, and divisionally injects fuel in at least two injections including a trailing injection that begins to inject after a middle period of a compression stroke, and a leading injection earlier than the trailing injection within a period from an intake stroke to an ignition timing before the catalyst warms up, comprising:

varying means for forcibly changing an intake flow strength in the combustion chamber, wherein an air-fuel ratio in the combustion chamber is set to be $\lambda \approx 1$ before the catalyst warms up, and said varying means operates to divisionally inject fuel at least during a former period from engine start until the catalyst, which is halfway through catalyst temperature rise, is partially activated, before the catalyst warms up, and to set the intake flow strength in the former period to be lower than that in a latter period halfway through the catalyst temperature rise after the former period, and wherein a swirl is generated in each cylinder with a local air-fuel ratio around a spark plug being richer than a mean air-fuel ratio of an entire cylinder by the trailing injection, and said varying means changes a swirl ratio given by (swirl flow angular velocity/engine rotation angular velocity) in each cylinder.

17. A control apparatus for a direct-injection engine, which comprises a fuel injection valve to directly inject fuel into a combustion chamber, and an exhaust gas purifying catalyst inserted in an exhaust path, and divisionally injects fuel in at least two injections including a trailing injection that begins to inject after a middle period of a compression stroke, and a leading injection earlier than the trailing injection within a period from an intake stroke to an ignition timing before the catalyst warms up, comprising:

an intake flow control valve to forcibly change an intake flow strength given by (intake flow angular velocity/engine rotation angular velocity) in the combustion chamber; and a controller to set an air-fuel ratio in the combustion chamber to be $\lambda \approx 1$ before the catalyst warms up, to operate said to intake flow control valve to divisionally inject fuel at least during a former period from engine start until the catalyst is in a partial activation state, which is an intermediate point during the catalyst temperature rise, an HC purifying ratio of the catalyst increasing according to the catalyst temperature rise but the HC purifying ratio being smaller than a maximum HC purifying ratio of the catalyst before the catalyst warms up, and to set the intake flow strength in the former period to be lower than in a latter period after the former period from the intermediate point.

* * * * *